(12) United States Patent
Wallace

(10) Patent No.: US 9,410,752 B2
(45) Date of Patent: Aug. 9, 2016

(54) HYDRONIC BUILDING SYSTEMS CONTROL

(71) Applicant: Albert Reid Wallace, Centennial, CO (US)

(72) Inventor: Albert Reid Wallace, Centennial, CO (US)

( * ) Notice: Subject to any disclaimer, the term of this patent is extended or adjusted under 35 U.S.C. 154(b) by 453 days.

(21) Appl. No.: 13/969,316

(22) Filed: Aug. 16, 2013

(65) Prior Publication Data

US 2014/0048244 A1    Feb. 20, 2014

Related U.S. Application Data

(60) Provisional application No. 61/684,564, filed on Aug. 17, 2012.

(51) Int. Cl.

| G05D 23/13 | (2006.01) |
|---|---|
| G05D 23/30 | (2006.01) |
| F28F 27/00 | (2006.01) |
| F24F 5/00 | (2006.01) |
| F24F 11/00 | (2006.01) |

(52) U.S. Cl.
CPC ............... *F28F 27/00* (2013.01); *F24F 5/0046* (2013.01); *F24F 11/006* (2013.01); *F24F 11/0008* (2013.01); *F24F 11/0012* (2013.01); *F24F 11/0015* (2013.01); *Y02B 10/20* (2013.01); *Y02B 10/24* (2013.01)

(58) Field of Classification Search
CPC ............... F24F 11/0086; F24F 11/006; F24F 2011/0067; F24D 2220/02; F24D 2220/04; G05D 23/13; G05D 11/16
USPC .................... 700/276; 165/287–300
See application file for complete search history.

(56) References Cited

U.S. PATENT DOCUMENTS

| 3,384,155 A | 5/1968 | Newton |
| 4,071,078 A | 1/1978 | Padden |
| 4,226,364 A | 10/1980 | Utesch |
| 4,841,733 A | 6/1989 | Dussault et al. |
| 5,261,251 A | 11/1993 | Galiyano |

(Continued)

OTHER PUBLICATIONS

"Air Quality in the Home," Illinois Dept. of Public Health, 2012, retrieved from http://web.archive.org/web/20120615151708/http://www.idph.state.il.us/envhealth/factsheets/airquality.htm, 5 pages.

(Continued)

*Primary Examiner* — Robert Fennema
*Assistant Examiner* — Jigneshkumar Patel
(74) *Attorney, Agent, or Firm* — Stanley J. Gradisar Attorney At Law, LLC; Stanley J. Gradisar

(57) ABSTRACT

Controlling heating and cooling in a conditioned space utilizes a fluid circulating in a thermally conductive structure in fluid connection with a hydronic-to-air heat exchanger and a ground heat exchanger. Air is moved past the hydronic-to-air heat exchanger, the air having fresh air supply and stale air exhaust. Sensors located throughout the conditioned space send data to a controller. User input to the controller sets the desired set point temperature and humidity. Based upon the set point temperature and humidity and sensor data, the controller sends signals to various devices to manipulate the flow of the fluid and the air in order to achieve the desired set point temperature and humidity in the conditioned space. The temperature of the fluid is kept less than the dew point at the hydronic-to-air heat exchanger and the temperature of the fluid is kept greater than the dew point at the thermally conductive structure.

16 Claims, 7 Drawing Sheets

(56) References Cited

U.S. PATENT DOCUMENTS

| | | | |
|---|---|---|---|
| 5,758,514 | A | 6/1998 | Genung et al. |
| 5,802,862 | A | 9/1998 | Eiermann |
| 5,915,473 | A | 6/1999 | Ganesh et al. |
| 6,138,744 | A | 10/2000 | Coffee |
| 6,170,271 | B1 | 1/2001 | Sullivan |
| 6,347,527 | B1 | 2/2002 | Bailey et al. |
| 6,533,186 | B2 | 3/2003 | Neve et al. |
| 6,742,582 | B1 | 6/2004 | Wheat et al. |
| 6,978,631 | B2 | 12/2005 | Fuller |
| 6,991,028 | B2 | 1/2006 | Comeaux et al. |
| 6,996,999 | B2 | 2/2006 | Wacker |
| 7,234,314 | B1 | 6/2007 | Wiggs |
| 7,334,419 | B2 | 2/2008 | Gordon et al. |
| 7,574,871 | B2 | 8/2009 | Bloemer et al. |
| 7,617,697 | B2 | 11/2009 | McCaughan |
| 7,654,104 | B2 * | 2/2010 | Groll ............... F25B 1/10 62/324.1 |
| 7,730,935 | B1 | 6/2010 | Bujak, Jr. |
| 7,740,184 | B2 | 6/2010 | Schnell et al. |
| 7,798,418 | B1 | 9/2010 | Rudd |
| 7,827,814 | B2 | 11/2010 | Slater |
| 7,845,185 | B2 | 12/2010 | Knight et al. |
| 2002/0029583 | A1 * | 3/2002 | Chung ............... F24F 1/0003 62/428 |
| 2006/0101820 | A1 | 5/2006 | Koenig et al. |
| 2006/0144578 | A1 | 7/2006 | Fiedrich |
| 2006/0235666 | A1 | 10/2006 | Assa et al. |
| 2006/0288724 | A1 * | 12/2006 | Ambs ............... F25B 13/00 62/260 |
| 2007/0205298 | A1 | 9/2007 | Harrison et al. |
| 2007/0206436 | A1 * | 9/2007 | Niermeyer ........ B01F 15/0416 366/152.4 |
| 2007/0261422 | A1 | 11/2007 | Crawford |
| 2008/0116289 | A1 | 5/2008 | Lochtefeld |
| 2008/0173433 | A1 | 7/2008 | Haglid |
| 2008/0289811 | A1 * | 11/2008 | Kariya ............... F24D 19/1033 165/300 |
| 2009/0101726 | A1 * | 4/2009 | Rankich ............ F24F 11/0012 236/51 |
| 2009/0287355 | A1 | 11/2009 | Milder et al. |
| 2009/0314848 | A1 | 12/2009 | Andersson |
| 2010/0049480 | A1 | 2/2010 | Pekar et al. |
| 2010/0084483 | A1 | 4/2010 | Pieper |
| 2010/0252232 | A1 | 10/2010 | Reich et al. |
| 2010/0300645 | A1 | 12/2010 | Glover |
| 2011/0048502 | A1 * | 3/2011 | Kikinis ............ F24D 11/0221 136/248 |

OTHER PUBLICATIONS

"Better Buildings, Brighter Future, Innovative Building Technologies and Practices Save Energy and Money," U.S. Dept. of Energy, EERE, 2010, 2 pages.

"Building Technologies Program, Planned Program Activities 2008-2012," U.S. Dept. of Energy, EERE, 2012, 132 pages.

"Buildings Sector Energy Consumption," Buildings Energy Data Book, U.S. Dept. of Energy, 2012, retrieved from http://web.archive.org/web/20150717171229/http://buildingsdatabook.eren.doe.gov/ChapterView.aspx, 3 pages.

"HBX ECO-1000 Central Processing Geothermal Control," HBX Control Systems Inc., 2012, retrieved from http://web.archive.org/web/*/http://hbxcontrols.com/eco-1000.php, 1 page.

"Humidity & Temperature Sensor 086-Flush Mount," tekmar Control Systems, 2012, retrieved from http://tekmarcontrols.com/products/accessories/086.html, 3 pages.

"Intermediate Energy Infobook, Statistics source," Energy Information Administration, 2012, pp. 44-48.

"Program Overview," U.S. Dept. of Energy, EERE, 2009, retrieved from http://web.archive.org/web/20090301000000*/http://apps1.eere.energy.gov/buildings/publications/pdfs/corporate/myp08overview_ch1.pdf, pp. 1-12.

"Securing America's Future with Energy Efficient Buildings," U.S. Dept. of Energy, 2012, retrieved from http://web.archive.org/web/20120604092742/http://www1.eere.energy.gov/buildings/about.html, 1 page.

"tekmarNet® Thermostat 557-Radiant Floor, 2 Heat Pump/Cool, Backup, Humidity," tekmar Control Systems, 2012, retrieved from http://tekmarcontrols.com/products/zoning/557.html, 5 pages.

"tN2 House Control 406—Heat Pump & Backup, Four Zone Valves," tekmar Control Systems, 2012, retrieved from http://tekmarcontrols.com/products/alternative-energy/406.html, 5 pages.

Brambley et al., "Advanced Sensors and controls for Building Applications: Market Assessment and Potential R&D Pathways," Pacific Northwest National Laboratory, 2005, 162 pages.

European Heat Pump Association, Outlook 2011, retrieved from http://web.archive.org/web/20120523042922/http://vvww.ehpa.org/fileadmin/red/Heat_Pump_Statistics/Preview_2011_finished.pdf, 8 pages.

European Heat Pump Association, Outlook 2012, retrieved from http://web.archive.org/web/20120916104927/http://www.ehpa.org/fileadmin/red/Heat_Pump_Statistics/Outlook2012_PREVIEW_01.pdf, 8 pages.

Feustel, "Hydronic Radiant Cooling-Overview and Preliminary Performance Assessment," Lawrence Berkeley Laboratory, 1993, 43 pages.

Hall et al., "School Indoor Air Quality Best Management Practices Manual," Washington State Dept. of Health, 2003, 135 pages.

Hassell et al., "Building Better Homes, Government Strategies for Promoting Innovation in Housing," RAND Science and Technology Policy Institute, 2003, 124 pages.

Karlsson et al., "Capacity-controlled ground source heat pumps in hydronic heating systems," International Journal of Refrigeration, 2007, vol. 30(2), pp. 221-229, abstract only, 2 pages.

Karlsson et al., "Impact of design and thermal inertia on the energy saving potential of capacity controlled heat pump heating systems," International Journal of Refrigeration, 2008, vol. 31(6), pp. 1094-1103, abstract only, 2 pages.

Karlsson, "Capacity Control of Residential Heat Pump Heating Systems," Chalmers University of Technology, 2007, 115 pages.

Nemet, "U.S. Energy Research and Development: Declining Investment, Increasing Need, and the Feasibility of Expansion," University of California, 2006, pp. 1-36.

Olesen, "Radiant Floor Cooling Systems," ASHRAE Journal, 2008, pp. 16-22.

Proctor, "Pacific Gas and Electric Appliance Doctor Pilot Project," Proctor Engineering Group, Ltd., 1990, 115 pages.

Roth et al., "Energy Consumption Characteristics of Commercial Building HVAC Systems, vol. III: Energy Savings Potential," Tiax LLC, 2002, 281 pages.

Roth et al., "Energy Impact of Commercial Building Controls and Performance Diagnostics: Market Characterization, Energy Impact of Building Faults and Energy Savings Potential," Tiax LLC, 2005, Part 1, 200 pages.

Roth et al., "Energy Impact of Commercial Building Controls and Performance Diagnostics: Market Characterization, Energy Impact of Building Faults and Energy Savings Potential," Tiax LLC, 2005, Part 2, 213 pages.

Vineyard et al., "Field Evaluation of a Residential Hydronic Distribution System in the Cooling Mode," Ashrae Transactions, 2000, vol. 106, Part 2, MN-00-12-4, pp. 1-8.

Bjelm et al., "Country Update for Sweden," Lund University, 2010, retrieved from http://www.geothermal-energy.org/pdf/IGAstandard/WGC/2010/0137, pp. 1-9.

* cited by examiner

HBSC Energy Savings Potential Compared to Baseline HVAC System

Technology Gaps Addressed with HBSC

Client-Server Architecture

Comparison of temperature levels for a radiator system with no lag time and 10 minutes lag time. Fixed speed GHP operating at 100% with DOAT at 48 degrees F.

GHP Parallel Piping Design versus Serial Boiler Connection to Hydronic System

Boundaries for Optimizing the Demand and Source Systems

HYDRONIC BUILDING SYSTEMS CONTROL

CROSS-REFERENCES TO RELATED APPLICATIONS

This application claims the benefit of U.S. Provisional Application Ser. No. 61/684,564 filed on Aug. 17, 2012 titled "Hydronic Building Systems Control" which is incorporated herein by reference in its entirety for all that is taught and disclosed therein.

BACKGROUND

This disclosure is related to hydronic heating and cooling applications and more specifically to software control systems for hydronic heating and cooling applications.

Identification and Significance of the Problem or Opportunity—More energy is consumed by buildings than any other segment of the U.S. economy, including transportation or industry, with almost 41% of total U.S. energy consumption devoted to taking care of our nation's home and commercial building energy needs. This is an increase from 39% in 2006, which utilized approximately 39 quadrillion Btu (quads) of energy to service the 113 million households and 74.8 billion square feet of commercial floor space in the United States. Total building primary energy consumption in 2009 was about 48% higher than consumption in 1980. Space heating, space cooling, and lighting were the dominant end uses in 2010, accounting for close to half of all energy consumed in the buildings sector.

More than $400 billion is spent each year to power homes and commercial buildings, consuming more than 70% of all electricity used in the U.S. and contributing to almost 40% of the nation's carbon dioxide emissions. The Energy Information Administration estimates that energy consumption in buildings—primarily electricity and natural gas—will exceed fifty quads in the next two decades. If the U.S. can reduce building energy use by 20%, approximately $80 B would be saved annually on energy bills, and significant reduction of greenhouse gas emissions would be realized.

Next-generation building controls have the potential to produce significant energy savings in buildings. For example, annual energy consumption associated with functions addressed by conventional building controls—i.e., lighting, heating, cooling, and ventilation—totals nearly ten quads, or 57% of primary energy. These ten quads broadly frame the energy savings opportunity for building controls. Investment in energy-efficiency R&D within the buildings sector—especially in the key area of advanced controls—could significantly reduce energy consumption. However, the potential to realize these savings via innovative building controls has been hampered by several market and industry barriers.

First, R&D investment in the building industry is much lower than in many other industries. This is in part due to market fragmentation, with many actors required to construct and operate a building (e.g., manufacturers, designers, builders, subcontractors, suppliers, etc.). This limits the ability of the private sector to effectively coordinate research and reliably bring innovations to market. Moreover, building control innovations are particularly challenging to bring to this cost-sensitive market because their benefits are difficult to quantify—especially without independent verification of savings levels. Investment in building energy efficiency R&D by private companies dropped 50% between 1991 and 2003.

Development of innovative and cost-effective controls is also hampered by ownership issues of commercial and residential buildings. Building occupants who are not owners have little incentive to invest in building-efficiency improvements. The owners are also unwilling to upgrade to high-efficiency equipment and appliances because they do not see the benefit of reduced utility bills, which the occupant pays. For example, while utilities constitute only 1% of total building expenses, they account for 30% of tenant operating expenses. Peak demand charges account for 40% of commercial building electricity expenses, of which 75% of these relate to lighting and Heating, Ventilation, and Air Conditioning (HVAC) systems. Most commercial buildings are cooling dominated. Ground Source Heat Pumps (GHPs) can reduce peak demand charges by operating at one-half the peak load electrical demands of conventional equipment. When combined with hydronic high thermal mass distribution systems, GHP-centric HVAC systems have the potential to reduce tenant operating expenses over 20%. Hydronic as used herein is defined as the use of a fluid such as water as the heat-transfer medium in heating and cooling systems.

Prevailing design/bid/build paradigms also impede deployment of advanced controls, with focus on completing buildings quickly and inexpensively. Common sequential design processes make extensive use of prior design experience, resulting in a bias against innovative approaches with lower market adoption. Integrated and synergistic design of building systems is also challenged by current practices.

Finally, a central issue with installing controls to implement energy savings measures is that energy expenditures account for a small (approximately 1%) proportion of total annual building expenditures. Investment in core business activities often competes with energy-efficiency investments such as advanced controls. Building owners/operators must have very high levels of confidence that investments in building controls will have a quick payback for those investments to prove attractive. The innovation disclosed herein delivers the technology that will provide that high level of confidence.

Advanced, low-cost, "smart" building controls have the technical potential to reduce U.S. commercial building HVAC and lighting energy consumption by about one quad of primary energy annually, or roughly 6% of current total use. In addition, many offer significant peak-demand reduction potential. But as stated above, advanced building controls face first-cost and several non-economic barriers to realizing greater market penetration. The U.S. Department of Energy Building Technologies Program understands these unique technology and industry barriers to developing innovative technologies, and has requested high-risk, high-reward innovative research focused on technology that has the potential to contribute to a 50% reduction in energy demand by residential and commercial buildings at less than the cost of the energy saved (800 trillion Btu's in annual savings by 2020 and 3,000 trillion Btu's in annual savings by 2030).

As part of that "50% reduction" effort, the Department of Energy (DOE) is striving to develop and demonstrate "cross-cutting, whole building technologies such as sensors and controls. These efforts support the net zero energy buildings goal not only by reducing building energy needs, but also by developing design methods and operating strategies which seamlessly incorporate solar and other renewable technologies into commercial buildings."

Integrated hydronic heating and cooling applications have the potential to reduce the residential and commercial building energy use by 50% while increasing occupant comfort, safety, and indoor environmental quality at substantially less cost than the energy saved.

The Hydronic Building Systems Control (HBSC) described in this disclosure is a low-cost standards-compliant software-based control that integrates traditional and renewable hydronic system components for building heating, cooling, and hot water. HBSC addresses known technology gaps with a software solution, and produces a controls requirement specification that can be hosted on commodity hardware such as that developed for the smart phone market.

HBSC also addresses shortcomings of commonly used HVAC systems by removing barriers to market adoption of hydronic heating and cooling systems. Widespread use of forced air systems contributes to high healthcare costs and decreased occupant productivity caused by poor Indoor Environmental Quality (IEQ) and thermal comfort, while increasing vulnerability to terrorist attack with potential negative impact on public welfare and national security. Current hydronic system technologies, while highly energy efficient, struggle in the marketplace due to system cost, controller complexity, and retrofit difficulty. HBSC technology has the ability to overcome problems with forced air systems providing heating, cooling, and ventilation.

The American Society of Heating Refrigeration and Air Conditioning Engineers (ASHRAE) and international standards organizations mandate the use of mechanical ventilation to provide fresh air in tight buildings. For higher system energy efficiency, heat recovery is combined with the mechanical ventilation using an energy transfer and ventilation device. The heat exchange and ventilation is usually achieved with an air-to-air heat exchanger with one or more built-in fans, commonly known as a Heat Recovery Ventilator (HRV) or Energy Recovery Ventilator (ERV). In climates where heating is more prevalent than air conditioning, an HRV is used. In cooling climates, an ERV is recommended. In hot humid climates, air conditioning and/or dehumidification equipment are used in conjunction with ERVs or HRVs to enhance user comfort and indoor climate.

Within a HRV, contaminated exhaust air and fresh outside air pass through the heat recovery core in separate passages that prevent air contamination or mixture. The fresh outside air then absorbs the heat and warms up, and is distributed at a more comfortable temperature to the various rooms by the ventilation system. An HRV can help make mechanical ventilation more cost effective by reclaiming energy from exhaust airflows. HRVs use heat exchangers to heat or cool incoming fresh air, recapturing 60% to 80% of the conditioned temperatures that would otherwise be lost. Conventional fan and vent assemblies for bathrooms and kitchens, often required by building code standards for ventilation, may allow significant energy losses. An HRV system can incorporate small, separately switched booster fans in these rooms to control moisture or heat generated by activities like showering or cooking. Odors and pollutants can quickly be removed, but energy used to condition the air is recycled in the heat exchanger.

ERVs exchange moisture between the exhaust and fresh air streams. ERVs are especially recommended in climates where cooling loads place strong demands on HVAC systems. In some cases, ERVs may be suitable in climates with very cold winters. If indoor relative humidity tends to be too low, what available moisture there is in the indoor exhaust air stream is transferred to incoming outdoor air. However, ERVs are not dehumidifiers. While the ERV transfers moisture from the humid air stream (incoming outdoor air in the summer) to the exhaust air stream, the desiccant wheels used in many ERVs become saturated fairly quickly and the moisture transfer mechanism becomes less effective with successive hot, humid periods. Mechanical vapor compression refrigeration equipment, known as air conditioners, is the most common approach utilized to reduce humidity while cooling.

Refrigeration air conditioning equipment usually reduces the humidity of the air processed by the system. The process is highly effective in cooling to reduce sensible and latent heat contained in the air. Sensible heat is the energy exchanged by a thermodynamic system that has as its sole effect a change of temperature. Latent heat is the quantity of heat absorbed or released by a substance undergoing a change of state, such as ice changing to water or water to steam, at constant temperature and atmospheric pressure. A forced-air cooling system has the ability to remove sensible heat (cooling the air) and remove latent heat (through dehumidification which removes heat contained in the water vapor in the air stream). The dew point is the temperature below which the water vapor in a volume of humid air at a given constant barometric pressure will condense into liquid water at the same rate at which it evaporates. The relatively cold (below the dew point) evaporator coil condenses water vapor from the processed air (much like an ice-cold drink will condense water on the outside of a glass), sending the water to a drain and removing water vapor from the cooled space and lowering the relative humidity. Since humans perspire to provide natural cooling by the evaporation of perspiration from the skin, drier air (up to a point) improves the comfort provided. Humans are most comfortable when 40% to 50% relative humidity is maintained in the occupied space.

A specific type of air conditioner that is used only for dehumidifying is called a dehumidifier. A dehumidifier is different from a regular air conditioner in that both the evaporator and condenser coils are placed in the same air path, and the entire unit is placed in the environment that is intended to be conditioned (in this case dehumidified), rather than requiring an external condenser coil. Having the condenser coil in the same air path as the evaporator coil produces warm, dehumidified air. The evaporator (cold) coil is placed first in the air path, dehumidifying the air exactly as a regular air conditioner does. The air next passes over the condenser coil re-warming the now dehumidified air. Note that the terms "condenser coil" and "evaporator coil" do not refer to the behavior of water in the air as it passes over each coil; instead they refer to the phases of the refrigeration cycle. Having the condenser coil in the main air path rather than in a separate, outdoor air path (as in a regular air conditioner) results in two consequences—the output air is warm rather than cold, and the unit is able to be placed anywhere in the environment to be conditioned, without a need for an external condenser.

Unlike a regular air conditioner, a dehumidifier will actually heat a room just as an electric heater that draws the same amount of power as the dehumidifier. A traditional air conditioner transfers energy out of the room by means of the condenser coil, which is outside the room. In this thermodynamic system, the room is the system and energy is transferred out of the system. Conversely with a dehumidifier, no energy is transferred out of the thermodynamic system because the dehumidifier is entirely inside the room. The power consumed by the dehumidifier is energy that is input into the thermodynamic system and remains in the room as heat energy.

Air-conditioning systems using cooling towers can promote the growth and spread of microorganisms, such as *Legionella pneumophila*, the infectious agent responsible for Legionnaires' disease, or thermophilic actinomycetes. Conversely, air conditioning, including filtration, humidification, cooling, disinfection, etc., can be used to provide a clean, safe, hypoallergenic atmosphere in environments where an appropriate atmosphere is critical to occupant safety and well-being. Air conditioning can have a negative effect by drying out the air causing dry skin and negatively affecting sufferers of allergies and asthma. Air conditioning can also be used for dehumidification, as water vapor condenses on the air coil during cooling.

Specific issues associated with forced air HVAC systems include:

1. Poor Energy Performance Due To Distribution Ductwork

Poorly installed forced air residential HVAC systems often use twice the energy of a properly installed system. Duct leakage in commercial buildings accounts for 0.3 quads of annual energy consumption. In a study involving residences in Fresno, Calif., 93% of the homes had duct leakage greater than 150 cubic feet per minute. A recent audit of certified air conditioning contractors by Xcel Energy for a high efficiency rebate program in Colorado found that in 46% of the retrofit installations conducted in 2011, neither the ductwork nor the equipment was installed correctly.

2. Poor IEQ and Thermal Comfort

Prior research shows a correlation between employee productivity, IEQ, and thermal comfort. The costs attributable to these indoor climate conditions have a greater economic impact than all building operations and energy expenses combined. The dominance of worker salaries as a percentage of office building expenses is staggering, accounting for approximately 80% of expenditures in a small office building. Increasing employee productivity 2% would offset all building operations and energy expenses combined. The healthcare and legal costs associated with poor IEQ are equally formidable. For example, Legionnaire's disease can occur from the airborne dispersal of Legionella bacteria from improperly maintained cooling towers, humidifiers, and evaporative condensers. Most building owners do not acknowledge that forced air HVAC systems are causal agents to poor IEQ resulting in higher absenteeism or poor health.

3. Vulnerability to Terrorist Attack

Commercial building owners are ignorant of the terrorist risk inherent with large forced air systems. Ground-mounted HVAC equipment and the related forced air distribution systems which return air from any one zone to the entire building ventilation system are particularly vulnerable. Due to the air volume required to heat, cool, and ventilate, a typical 100 ton rated Variable Air Volume (VAV) system weighs over twenty tons and requires 5,000 cubic feet of space. A 100,000 square foot building requires four of these units. In many cases the size and weight requirements force a designer to place the units at ground level. By introducing a chemical, biological, radioactive, or nuclear agent into these systems, a terrorist could inflict mass human casualties and great psychological damage.

Although hydronic systems offer solutions to these shortcomings, they bring with them a unique set of adoption barriers, including:

1. Market Bias

While HVAC system designers have a bias toward vapor compression technology, the highest system energy efficiency is possible with the direct use of heated or cooled fluids in a hydronic distribution system (radiant floor, radiant ceiling panels, chilled beams, or hydronic fan coils). Passive cooling using chilled fluid from a Ground Source Heat Exchanger (GHEX), and passive heating using process heat or solar fluid provides the highest system energy efficiency. The system design is straightforward, and the heat transfer can be accomplished with a low energy circulator, without the need for a boiler, chiller, or GHP. However, a barrier to adoption is the lack of a commercial control appropriate for this application.

2. Perceived High First Cost

High mass radiant floor systems are perceived to have a higher first cost than ducted air systems. HVAC systems designers in the U.S. prefer forced air systems over hydronic systems, though most will acknowledge that radiant floor heating systems are more comfortable with improved IEQ to the forced-air alternative. Designers incorrectly assume these technologies are incompatible. Hydronic distribution used in conjunction with hydronic fan coils is a viable compromise, particularly with Water-to-Water (W-W) GHPs providing both hot and chilled water. An in-floor high mass radiant heating and cooling system—installed at a lower cost than a ducted air system—would be market disrupting.

3. Poor Hydronic Control Outcomes

Customers lack confidence in advanced control capabilities and the energy savings benefits of integrated renewable energy equipment, such as GHPs, for the following reasons:

a. Most conventional off-the-shelf controls are functional for one device using a few sensors. With few exceptions, such as set-back capabilities, they do not provide optimal system energy efficiency. Residential examples include separate controls for the furnace, hot water and HRV/ERV, with more pronounced energy losses and thermal discomfort issues in large commercial buildings which have even less zoning functionality.

b. Enterprise Direct Digital Controls (DDCs) are expensive to install, program and maintain. Soft costs for design, implementation, commissioning, and maintenance are substantial, often eliminating any value for controls investment. Enterprise controls may provide interoperability, yet usually do not provide higher system energy efficiency. Besides the first cost of these controls, this lack of proven performance represents the largest market barrier. DDC is complicated, proprietary and owners often feel "held hostage" by controls companies. The high soft costs associated with these controls reduce building commissioning rates to less than 5% for new construction and 0.03% of existing buildings.

c. Lowest Common Denominator Control Solutions—The HVAC industry is segmented by product. Manufacturers, suppliers, and installers are aligned to these product lines. The end result is serial control of disparate equipment with minimal consideration or expertise applied to system energy efficiency. Design professionals, builders, and HVAC contractors will require a baseline system architecture which is affordable, easy to implement, and provides seamless interoperability between legacy equipment and emerging technology.

d. Inadequate controls and equipment efficiency ratings based on steady state test conditions have created distrust by building owners toward control and equipment manufacturers who have failed to deliver on efficiency claims. Equipment efficiency ratings for heating (Coefficient Of Performance, COP) and cooling (Seasonal/Energy Efficiency Ratings, SEER/EER) published by the Air Conditioning and Heating Institute (ARI) are not substantial for predicting actual system performance. The ARI metrics are based on steady state moderate test conditions without consideration for overall system energy efficiency (Seasonal Performance Factor, SPF)

affected by seasonal temperature extremes, partial load conditions, intermittent operation and HVAC distribution efficiency.

e. Hydronic distribution systems are more efficient than forced air systems. Yet commercial controls in the U.S. for hydronic applications are limited. These systems may incorporate space heating and cooling via a radiant floor, radiant ceiling, or distributed hydronic fan coils. In all of these distribution methods, the highest system energy efficiency gains are possible by controlling the operation of the heating/cooling equipment along with the supply temperature.

f. W-W ground source heat pumps are more efficient with greater functionality than boilers, yet the available GHP hydronic controls use boiler control logic. Within the U.S., the majority of W-W ground source heat pumps utilize a single stage compressor and do not require multi-stage controls. However, when a W-W GHP is equipped with a two-stage compressor, the typical control is single stage.

g. Water-to-Air (W-A) GHPs are more efficient with greater functionality than furnaces with direct exchange cooling or air source heat pumps, yet the available controls are often modified furnace/air conditioner thermostats with three levels of heating, two cooling, and a fan mode. Source circulator control as provided by the GHP manufacturer is typically a binary relay. Since the source circulators are usually contained in one "flow center," this on-off functionality activates all of the source side circulator pumps providing sufficient flow for the rated maximum capacity of the GHP. In a residential application utilizing a GHP equipped with a two-stage compressor, the GHP operates at second stage less that 20% of the heating/cooling season. One pump in a typical two pump flow center uses 500 watts of power. If the heat pump is rated at 6 tons, two pumps are used. Yet at partial load conditions, only one pump is required. By reducing the source flow when the GHP is at partial load conditions, the system energy efficiency is increased without changing the GHP's component efficiency. The excessive energy use of these circulators under partial load conditions is not accounted for in GHP ARI ratings. In typical applications, the circulators are fixed speed. Unless the GHP or controls manufacturer provides energy efficient circulator control, the overall highest system energy efficiency—which includes the energy consumption of source side circulator pumps—is not optimum. If the manufacturer does not provide relays for multiple pumps, multiple speed pumps, or variable speed pumps control, installing contractors install the flow center with all pumps active regardless of actual flow requirements under partial load conditions. These limitations cause the GHPs to underperform with respect to advertised efficiencies derived in steady state testing. Recently, dedicated variable speed controllers are offered on board heat pumps equipped with variable speed compressors. Source side pump control is not typically available for enterprise control of multiple heat pumps. Attaining the highest system energy efficiency determines the operation of the circulator pumps. An industry acceptable flow rate for a ground or water source heat pump is 3 gallons per minute per ton of actual output. A heat pump incorporating a multi-stage or variable speed compressor does not require flow at the rated capacity, rather a flow rate which meets the actual capacity. The required flow may also be varied based on the entering water temperature to the heat pump. However, existing logic boards with the GHPs assume that source water temperature cannot be varied, so available controls do not account for water temperature variances when optimizing system energy efficiency.

4. Lost Cost Reduction Opportunities are Missed without Synergistic Design a. High mass radiant floor heating infrastructure can use the same distribution medium for cooling. Due to a lack of capable and cost effective controls for chilled beams and Radiant Floor Cooling (RFC), building owners typically install two complete distribution systems—high mass radiant hydronic heating and ducted air system for cooling and ventilation. Radiant cooling systems use 42% less energy than comparable VAV systems (see Table 1 below).

TABLE 1

Peak HVAC Energy Consumption Comparison, VAV versus Radiant Cooling

| Item | % Power in VAV | % Power in Radiant Cooling |
|---|---|---|
| Fan And Motor | 37.5% | 1.5% |
| Load From Lights | 18.8% | 9.4% |
| Air Transport Load | 9.3% | 1.9% |
| Other Loads | 34.4% | 34.4% |
| Pumps | — | 1.5% |
| Total | 100% | 57.7% |

The savings illustrated above result from the efficiencies created by hydronic distribution, increased effectiveness of radiant cooling to remove infrared heat gains from direct solar and lighting sources, and reduced air transport loads. These savings are based on using traditional chillers operating at less than one-half the efficiency of W-W GHPs. GHPs are ideal to replace boilers in Radiant Floor Heating (RFH) applications due to the lower supply temperatures required with radiant hydronic distribution. Building owners often replace inefficient boilers with condensing boilers as the first costs of GHPs do not justify an investment for heating only operations. Yet GHP equipment combined with radiant cooling architectures would decrease energy use far more than the 42.3% savings predicted above.

b. Hydronic heating and cooling systems create an opportunity to incorporate Dedicated Outdoor Air System (DOAS) or Demand Controlled Ventilation (DCV) to improve system energy efficiency, IEQ, and occupant comfort. When forced air systems are designed for ventilation and latent heat extraction only, and not the building heating and cooling sensible loads, the required air velocity and volume are greatly reduced. DOAS is a type of HVAC system that consists of two parallel systems: a dedicated outdoor air ventilation system that handles latent loads and a parallel system to handle sensible loads. DCV systems modulate outdoor intake based on carbon dioxide levels. These systems have a simple payback period of 2-5 years and the national energy savings potential of 0.3 quads.

c. Solar thermal array capacity is constrained by storage capacity. Solar thermal tanks require a higher first cost investment than solar thermal collectors. Reducing the requirement to install storage tanks to match the solar array could reduce the first cost of solar thermal arrays by 50%, while eliminating the maintenance and replacement costs for over sizing storage to meet array demands. A ground source heat exchanger is ideal to handle this excess capacity, yet GHP contractors are not familiar with design criteria for this hybrid system and lack the controls to implement a design.

SUMMARY

This Summary is provided to introduce in a simplified form a selection of concepts that are further described below in the Detailed Description. This Summary is not intended to identify key or essential features of the claimed subject matter, nor is it intended to be used to limit the scope of the claimed subject matter.

The Hydronic Building Systems Control is a temperature and humidity control apparatus for air and temperature variable fluid in an air space, comprising a thermally-conductive structure, such as a building floor, wall, or ceiling; hydronic coil-to-air heat exchanger; a source of liquid coolant at a temperature below or above the temperature of the air space; controllable means for applying a temperature variable liquid at a temperature higher than the dew point of the air space to the thermally-conductive structure and for applying a temperature variable liquid coolant at a temperature lower than the dew point to the hydronic coil-to-air heat exchanger; means for sensing at least the air temperature in the air space, a relative humidity of the air space, a temperature of the thermally-conductive structure, and liquid source temperatures; a controller coupled to the sensing means and to the controllable means.

Proposed Innovation Objectives—The Detailed Description below describes HBSC which addresses barriers facing well-integrated hydronic system solutions and increases the adoption of technologies that can surpass the energy performance of conventional forced air distribution systems, while providing superior health, safety, and comfort benefits. Objectives of HBSC include, but are not limited to:

1. Delivery at Speed and Scale—Commercialize a product in less than two years at a price which drives rapid market adoption.
2. Interoperability—Design interoperable solutions that improve the ease and likelihood of system energy efficiency retrofits.
3. Accelerate the implementation of affordable hydronic distribution systems.
4. Increase the market acceptance for ground source heat pumps.
5. Lower the cost and improve the solar fraction of solar thermal systems.
6. Create a control requiring minimal or no user input for optimum operation with high reliability and proven energy savings, which minimizes the soft costs attributable to installation, commissioning, and maintenance.
7. Drive the early adoption of high impact emerging technologies, which will improve the efficiency of integrated hydronic systems, including high thermal conductivity nanofluids, multifunction sensors, and self-optimizing algorithms.

Public Benefits—HBSC provides the following public benefits:

1. HBSC will ease the financial burden and accelerate the adoption of system energy efficiency improvements reducing environmental impact and global energy use for building heating, cooling, and hot water.
2. Reduce the soft costs attributable to installation, commissioning, and maintenance through self-optimization and intuitive graphical user interface.
3. Lower operating costs with a reliable control which builds owner confidence creating wider acceptance of hydronic distribution and enterprise systems.
4. Improve IEQ and thermal comfort which increases occupant productivity and health, and reduces absenteeism and associated health care costs.
5. Eliminate the potential vulnerabilities associated with exposed air handling equipment in commercial buildings with hydronic distribution systems which decouple heating and cooling from ventilation air flows.
6. Increase market adoption of GHP and solar thermal technologies.
7. Accelerate the adoption of emerging technologies which will improve energy efficiency, such as enhanced thermal conductivity nanofluids, multifunction sensors, and self-optimizing algorithms for optimal system energy efficiency.

Figure 1:
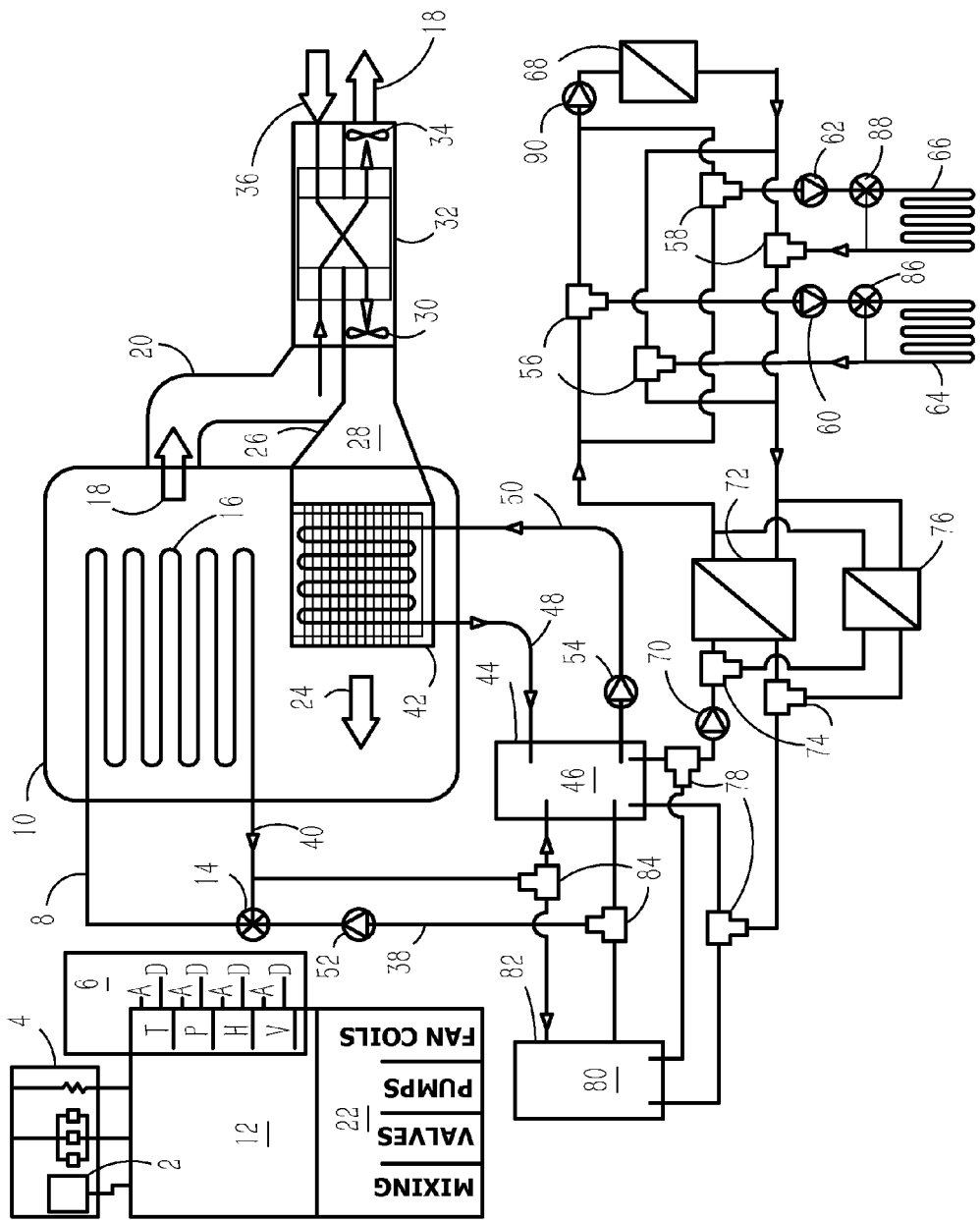
FIG. 1 is a process model diagram that shows the requisite control functionality and critical parameters of an embodiment of HBSC.

To assist in the understanding of the present disclosure the following Table Of Components and associated numbering found in the drawings is provided below.

| Table of Components | |
|---|---|
| Component | # |
| User Interface | 2 |
| Communications Module | 4 |
| Sensor Inputs | 6 |
| Mixed Radiant Supply Fluid | 8 |
| Conditioned Space | 10 |
| Microprocessor Controller | 12 |
| Radiant Mixing Device | 14 |
| Thermally-Conductive Structure | 16 |
| Stale Exhaust Air | 18 |
| Air Duct Exhaust | 20 |
| Devices Controller | 22 |
| Conditioned Air | 24 |
| Air Duct Intake | 26 |
| Fresh Intake Air | 28 |
| Fresh Air Fan | 30 |
| Energy Transfer and Ventilation Device | 32 |
| Exhaust Air Fan | 34 |
| Fresh Air Supply | 36 |
| Hydronic Supply Fluid | 38 |
| Hydronic Return Fluid | 40 |
| Hydronic Coil-to-Air Heat Exchanger | 42 |
| Thermal Storage Temperature Sensor One | 44 |
| Thermal Storage One | 46 |

-continued

Table of Components

| Component | # |
|---|---|
| Hydronic Coil Return Fluid | 48 |
| Hydronic Coil Supply Fluid | 50 |
| Hydronic Load Circulator | 52 |
| Hydronic-to-Air Circulator | 54 |
| Source 3-Way Control Valves One | 56 |
| Source 3-Way Control Valves Two | 58 |
| Source Side Circulator One | 60 |
| Source Side Circulator Two | 62 |
| Ground Heat Exchanger One | 64 |
| Ground Heat Exchanger Two | 66 |
| Process Heat Exchanger | 68 |
| Load Circulator | 70 |
| Heat Pump | 72 |
| Bypass 3-Way Control Valves | 74 |
| Source Heat Exchanger | 76 |
| Thermal Storage Source 3-Way Control Valves | 78 |
| Thermal Storage Two | 80 |
| Thermal Storage Temperature Sensor Two | 82 |
| Thermal Load 3-Way Control Valves | 84 |
| Source Mixing Device One | 86 |
| Source Mixing Device Two | 88 |
| Process Heat Circulator | 90 |
| Client Server Architecture | 400 |
| Client | 402 |
| Client | 404 |
| Client | 406 |
| Server | 408 |

DETAILED DESCRIPTION

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Technical Approach—Described in detail below is a low cost standards-based integrated Hydronic Building Systems Control. One embodiment is based on the BACnet protocol and HBSC algorithms are hosted on commodity hardware developed for the smart phone market. HBSC provides interoperability between legacy and new HVAC equipment, and is designed using a process model which incorporates hydronic fan coils and high mass radiant floor hydronic heating and cooling incorporating ground source heat pumps source circulator control, process heat and solar thermal sources, ground heat exchanger passive cooling, and dew point tracking for high mass radiant cooling applications.

Referring now to the Figures, like reference numerals and names refer to structurally and/or functionally similar elements thereof, and if objects depicted in the figures that are covered by another object, as well as the tag line for the element number thereto, may be shown in dashed lines. FIG. 1 is a process model diagram that shows the requisite control functionality and critical parameters of an embodiment of HBSC. To simplify the control optimization strategy, HBSC utilizes the explicit process model shown in FIG. 1 to determine critical parameters. Since this approach is vendor and technology agnostic, HBSC provides direct control and interoperability through modulation of single or multi-stage legacy equipment while providing a path to accommodate emerging Variable Speed (VS) devices with onboard optimization. HBSC uses a model-based design with minimal sensed feedback for reduced cost, and operates more rapidly than direct search method approaches, which perturb physical process variables to reactively optimize system performance. Notwithstanding the above, one skilled in the art will recognize that individual components shown in FIG. 1 can be arranged in many different configurations, and that specific components may be different types of devices selected to meet specific requirements for a given structure. FIG. 1 should not be viewed in a limiting way, but as an exemplary embodiment of the features and functions as set out in the claims that follow.

HBSC Innovation Description and Sequence of Controls—Referring now to FIG. 1, HBSC is based on a model consisting of a combination of analog devices using a circulating fluid to heat or cool a Conditioned Space 10, such as a room in a home or an office in a building, or multiple conditioned spaces, in a Thermally-Conductive Structure 16, such as radiant floors, walls, and ceilings, or chilled beams.

The fluid may be used to transfer energy by circulating the fluid through a Hydronic Coil-to-Air Heat Exchanger 42 in combination with a device which moves air through Hydronic Coil-to-Air Heat Exchanger 42. The fluid may be water, propylene glycol, ethanol, methanol, or any other suitable fluid that is typically non-corrosive. In another embodiment, Hydronic Coil-to-Air Heat Exchanger 42 may be a dehumidifier, and air conditioning unit (mechanical vapor compression refrigeration equipment), an absorption chiller, or a heat recovery ventilator. The air moving device may be a fan, or Energy Transfer and Ventilation Device 32 such as an ERV, HRV, water-to-air heat pump, water-to-water heat pump, air-to-water heat pump, air conditioner, or dehumidifier.

Energy Transfer and Ventilation Device 32 uses two or more fans, such as Fresh Air Fan 30 and Exhaust Air Fan 34, to bring Fresh Air Supply 36 into Conditioned Space 10 while removing Stale Exhaust Air 18. Typical implementations utilize ventilation comprising Air Duct Intake 26 and Air Duct Exhaust 20. In this process, Energy Transfer and Ventilation Device 32 exchanges energy between the air flows (Fresh Air Supply 36 and Stale Exhaust Air 18), which includes water vapor in the air, causing a change in humidity. The air flow into the conditioned space is Conditioned Air 24 which differs from outside air based on interaction with Energy Transfer and Ventilation Device 32. The entering fluid to Hydronic Coil-to-Air Heat Exchanger 42 is Hydronic Coil Supply Fluid 50. The leaving fluid is Hydronic Coil Return Fluid 48. Hydronic Coil Supply Fluid 50 is pumped from Thermal Storage One 46 with Hydronic Coil-to-Air Circulator 54. The temperature of the fluid in Thermal Storage One 46 (typically a chilled fluid storage tank) is sensed by Thermal Storage Temperature Sensor One 44. The temperature of the fluid in Thermal Storage Two 80 (typically a heating fluid storage tank) is sensed by Thermal Storage Temperature Sensor Two 82.

When Hydronic Coil Supply Fluid 50 entering Hydronic Coil-to-Air Heat Exchanger 42 is sufficiently colder than the dew point of Fresh Intake Air 28, water will condense on Hydronic Coil-to-Air Heat Exchanger 42 causing Conditioned Air 24 to be dehumidified.

The fluid in Thermal Storage One 46 (typically cold) or Thermal Storage Two 80 (typically hot) may be used to transfer energy through Thermally-Conductive Structure 16. Typical structures utilize low or high mass mediums in which tubing is mounted or embedded. Applications include radiant floor, walls and ceilings, or chilled beams. The temperature of Mixed Radiant Supply Fluid 8 is controlled with Radiant Mixing Device 14 by modulating the mixed flow of Hydronic Supply Fluid 38 with Hydronic Return Fluid 40. Hydronic Supply Fluid 38 is pumped by Hydronic Load Circulator 52 from Thermal Storage One 46 or Thermal Storage Two 80 based on the position of the Thermal Load 3-Way Control Valves 84. In cooling mode, the Mixed Radiant Supply Fluid 8 is circulated at a temperature above dew point to prevent condensation in Thermally-Conductive Structure 16. Chilled fluid below dew point contained in Thermal Storage One 46, and used to dehumidify air in Hydronic Coil-to-Air Heat Exchanger 42, is mixed to a temperature above dew point to circulate in Thermally-Conductive Structure 16.

The source of chilling or heating for the fluids contained in Thermal Storage One 46 and Thermal Storage Two 80 may be active or passive. Active heating and chilling is provided from Heat Pump 72, or an active source containing Process Heat Exchanger 68 (typically a boiler, chiller, solar thermal array, combined heat and power unit (CHP or "cogeneration"), or an absorption chiller). Passive heating and chilling is provided from an open or closed loop Ground Heat Exchanger One 64 and Ground Heat Exchanger Two 66 or Process Heat Exchanger 68 for waste heat or cooling.

An open loop ground heat exchanger uses ground water directly as a heating or cooling medium, extracting and then discharging water to the ground. A closed loop ground heat exchanger, as depicted at Ground Heat Exchanger One 64 and Ground Heat Exchanger Two 66 utilizes piping embedded in the ground or surface water through which thermally-conductive fluid is circulated.

One embodiment utilizes a ground source heat pump, such as Heat Pump 72, for active chilling or heating Thermal Storage One 46 or Thermal Storage Two 80. Another embodiment utilizes an air source heat pump (not shown) without a requirement for a Ground Heat Exchanger One 64 and Ground Heat Exchanger Two 66. In chilling operation, Heat Pump 72 cools with Thermal Storage Source 3-Way Control Valves 78 directed to Thermal Storage One 46. In heating operation, Heat Pump 72 heats with Thermal Storage Source 3-Way Control Valves 78 directed to Thermal Storage Two 80. Load Circulator 70 moves fluid from Thermal Storage One 46 and Thermal Storage Two 80 through the load side heat exchanger contained within Heat Pump 72.

Heat Pump 72 may operate using an open loop or closed loop ground heat exchanger. In one embodiment, as shown in FIG. 1, Heat Pump 72 actively heats/chills using an electric vapor compression process with a closed loop ground heat exchanger comprised of Ground Heat Exchanger One 64 and Ground Heat Exchanger Two 66. This type of heat exchanger is known in the industry as the "source side" heat exchanger. While typical ground source heat pumps use one closed loop ground heat exchanger, the source side embodiment shown in FIG. 1 may use all or part of the ground heat exchanger, with and without utilizing heating or chilling from Process Heat Exchanger 68. The amount of flow through Ground Heat Exchanger One 64 versus Process Heat Exchanger 68 is a function of the position of Source 3-Way Control Valves One 56. The flow through Ground Heat Exchanger Two 66 is a function of the position of Source 3-Way Control Valves Two 58. Flow through Ground Heat Exchanger One 64 and Ground Heat Exchanger Two 66 is delivered by Source Side Circulator One 60, Source Side Circulator Two 62, and Process Heat Circulator 90. The fluid mixing between Ground Heat Exchanger One 64 and Ground Heat Exchanger Two 66 and Process Heat Exchanger 68 is the function of Source Mixing Device One 86 and Source Mixing Device Two 88.

Attaining the highest system energy efficiency determines the operation of the circulator pumps contained in Source Side Circulator One 60 and Source Side Circulator Two 62. At maximum capacity operation and utilization of Ground Heat Exchanger One 64 and Ground Heat Exchanger Two 66, all pumps in the Source Side Circulator One 60 and Source Side Circulator Two 62 are activated when Heat Pump 72 turns on. When Heat Pump 72 is equipped with a two-stage compressor, logic within the Microprocessor Controller 12 activates relays contained within Devices Controller 22 to affect operation of the circulator pumps contained in Source Side Circulator One 60 and Source Side Circulator Two 62. For multiple fixed speed pumps, a relay for each pump is activated to provide sufficient flow rate to Heat Pump 72 based on Microprocessor Controller 12 data. Factors affecting the source side required flow for Heat Pump 72 performance include entering water temperature from Sensor Inputs 6, the compressor output and heating or cooling mode demanded by Microprocessor Controller 12, and calculated performance data provided by the manufacturer and known to Microprocessor Controller 12. For multiple speed and variable speed pumps contained in Source Side Circulator One 60 and Source Side Circulator Two 62, digital output is provided by Microprocessor Controller 12 to one or both Source Side Circulator One 60 and Source Side Circulator Two 62 to meet required source side flow rate as calculated by Microprocessor Controller 12 to optimize system energy efficiency. One embodiment is a 0-10 volt input signal corresponding to 0-100% output pump capacity. When Ground Heat Exchanger One 64 and Ground Heat Exchanger Two 66 are utilized in split operation, as one for heating and one for cooling, Microprocessor Controller 12 will activate the respective Source Side Circulator One 60 and Source Side Circulator Two 62 at the pump capacity to meet the required source side flow rate for Heat Pump 72 to meet capacity demand.

For passive heating and cooling, Thermal Storage One 46 and Thermal Storage Two 80 are heated or cooled without engaging Heat Pump 72 operation. Ground Heat Exchanger One 64 and Ground Heat Exchanger Two 66 and Process Heat Exchanger 68 fluids bypass the Heat Pump 72. These fluids may be circulated directly into Thermal Storage One 46 or Thermal Storage Two 80, or transfer energy through Source Heat Exchanger 76 as shown in the embodiment of FIG. 1. Typical ground heat exchanger fluids are at low grade temperatures, so direct use in cooling is an appropriate application. Bypass 3-Way Control Valves 74 enable direct use of source side heat exchanger fluids bypassing Heat Pump 72. Load Circulator 70 affects flow between Thermal Storage One 46 or Thermal Storage Two 80 and Source Heat Exchanger 76 based on the position of Thermal Storage Source 3-Way Control Valves 78. When Source Heat Exchanger 76 is utilized, the Source Side Circulator One 60 and Source Side Circulator Two 62 or Process Heat Circulator 90 must also be activated to establish heat transfer across Source Heat Exchanger 76.

The proposed innovation is a control for a hydronic building system for space cooling and heating. The control system for controlling a hydronic building system for space cooling and heating consists of at least one of a User Interface 2; Communications Module 4; Sensor Inputs 6 for sensing temperature, atmospheric pressure, humidity, and velocity; Microprocessor Controller 12; and Devices Controller 22. These devices can operate as separate modules or integrated components.

User Interface 2 provides functionality for setting system operating parameters, observing system operations, and controlling system performance. Typical embodiments range from a simple menu selection for input with numerical output, to dynamic graphical display which changes based on digital and analog output. The primary embodiment is a graphical user interface typically utilized for smart phones and content-rich portable computing devices. In this embodiment, User Interface 2, Communications Module 4, and Microprocessor Controller 12 are hosted on a single device.

In another embodiment, User Interface 2 is a separate device, or a software application residing on a general purpose computing platform and operating system. Communications Module 4 enables communications between User Interface 2, Microprocessor Controller 12, and devices external to HBSC. External weather and climate data are provided to HBSC through Communications Module 4. Typical embodiments are based on industry standard building automation protocols, including BACnet, Modbus, and Lon Works. Microprocessor Controller 12 hosts the software algorithms containing system functionality. This compact embedded microprocessor system accepts digital input from User Interface 2 and digital/analog input from Sensor Inputs 6, and generates digital output to User Interface 2, Communications Module 4, digital and analog components within the Devices Controller 22.

To reduce development costs and increase manufacturing feasibility, open source software and hardware is used, including Microprocessor Controller 12, device operating system, shared libraries, and BACnet communications protocol. Open protocols are standardized communications and network layers published for use by any device manufacturer. HBSC architecture is designed to work in concert with commercial building automation systems. In one embodiment, Microprocessor Controller 12 processes sensor data, applies algorithms to extract control outputs, and communicates those outputs via standard architectures, such as a BACnet link in one embodiment. Software functionality includes a minimal device operating system, shared libraries, and support for industry-standard communications. Microprocessor Controller 12 can operate as a stand-alone controller or provide output to the building automation system via BACnet, to execute algorithms for device control. The Physical Communications Layer is an industry standard, such as 100 Base-T Ethernet between HBSC, the building automation system, and a network router. In one embodiment, the hardware consists of a series of microprocessors based on advanced Reduced Instruction Set Computing (RISC) machine cores, which are comparable to hardware available in recent smart phones and hosted using methods developed by the DOE National Renewable Energy Laboratory. In this embodiment, a modified Linux operating system is optimized for embedded applications processing.

SENSORS—Sensor Inputs 6 provide analog and digital input for system control. Control devices contain at least one member of the group consisting of sensor inputs for temperature, pressure, relative humidity, air and fluid velocity, and real time energy use. From these inputs, methods known in the art are used to calculate dew point, energy and thermal production (kWh and Btu's) and energy use by component and process. Control decisions use algorithms which provide the highest system energy efficiency as measured by energy produced divided by energy used over a time period. In one embodiment of the device controlling HBSC system as shown in FIG. 1, temperature sensors are located in:
Conditioned Space 10;
Thermally-Conductive Structure 16;
the outside air;
the input and output of Radiant Mixing Device 14;
Source Mixing Device One 86;
Source Mixing Device Two 88;
Thermal Storage One 46;
Thermal Storage Two 80;
Source 3-Way Control Valves One 56;
Source 3-Way Control Valves Two 58;
Bypass 3-Way Control Valves 74;
Thermal Storage Source 3-Way Control Valves 78;
Thermal Load 3-Way Control Valves 84;
Hydronic Supply Fluid 38;
Hydronic Return Fluid 40;
Hydronic Coil Return Fluid 48;
Hydronic Coil Supply Fluid 50;
demand and source supply and return on Heat Pump 72, Process Heat Exchanger 68, Heat Pump 72, and Source Heat Exchanger 76; and
supply and return to the Ground Heat Exchanger One 64 and Ground Heat Exchanger Two 66.

Fluid velocity sensors are located in:
Hydronic Load Circulator 52;
Hydronic-to-Air Circulator 54;
Source Side Circulator One 60;
Source Side Circulator Two 62;
Load Circulator 70; and
Process Heat Circulator 90.

Air velocity sensors are located in:
the supply and return fans of Fresh Air Fan 30;
Exhaust Air Fan 34;
Conditioned Air 24, and
Stale Exhaust Air 18.

Humidity and atmospheric pressure sensors are located in Conditioned Space 10. Devices which consume power during system operation are equipped with watt/hr meters. These include circulators (Hydronic Load Circulator 52, Hydronic-to-Air Circulator 54, Source Side Circulator One 60, Source Side Circulator Two 62, Load Circulator 70, and Process Heat Circulator 90); fans (Fresh Air Fan 30, Exhaust Air Fan 34); and Heat Pump 72. Using known methods, this sensor configuration is sufficient to calculate component and system energy efficiency in real time, and calculate dew point in real time in Conditioned Space 10 and Thermally-Conductive Structure 16. This information is used by HBSC algorithms to provide control outputs to digital and analog devices. System energy efficiency overrides component energy efficiency when energy savings is highest at the system level. The overall system power usage is determined from sensors. The component actual power usage is determined from sensors, or component calculated power usage using the component rated efficiencies (EER/COP) provided by the manufacturer using one or more performance parameters.

Devices Controller 22 accepts Microprocessor Controller 12 output to affect control of digital or analog devices including mixing (Radiant Mixing Device 14, Source Mixing Device One 86, and Source Mixing Device Two 88); 3-way valves (Source 3-Way Control Valves One 56, Source 3-Way Control Valves Two 58, Bypass 3-Way Control Valves 74, Thermal Storage Source 3-Way Control Valves 78, and Thermal Load 3-Way Control Valves 84); Heat Pump 72; Hydronic Coil-to-Air Heat Exchanger 42, Fresh Air Fan 30, and components which lack digital onboard input capabilities. Devices Controller 22 provides binary (on/off) control signals, or variable control signals (such as a 01-10 volt signal).

User Interface 2, Communications Module 4, Microprocessor Controller 12, and Devices Controller 22 are able to implement the controls strategy which optimizes system energy efficiency. The software and hardware of these four components have the flexibility to implement a wide variety of known control strategies. These include set point control, setback control, reset control, low and high limit control, LEAD/LAG control, high/low signal select, and averaging control. The control logic is implemented as (1) an open loop control in which decisions are based only on the model of how the system should operate; or (2) as a closed loop control in which the result of an output is fed back to the controller as an input. To simplify installation and commissioning, HBSC contains preset algorithms known to produce the highest system energy efficiency. An example is modulating the Source Side Circulator One 60 and Source Side Circulator Two 62 as a linear function to the compressor speed of Heat Pump 72. All of these settings of system operating parameters are stored in memory in Microprocessor Controller 12.

COOLING OPERATION—Conditioned Space 10 and Thermally-Conductive Structure 16 are at a temperature above the desired comfort set point temperature in Conditioned Space 10. HBSC is programmed with staged priority cooling and ventilation set to multiple stages, e.g., Stage 1—Energy Transfer and Ventilation Device 32; Stage 2—radiant floor cooling through Thermally-Conductive Structure 16; and Stage 3—forced air cooling through Hydronic Coil-to-Air Heat Exchanger 42.

If fresh air ventilation is required within Conditioned Space 10 or if the outdoor air temperature is lower than the desired comfort set point in Conditioned Space 10, HBSC activates the Energy Transfer and Ventilation Device 32 to circulate cool outside air in Conditioned Space 10. If the outside air is cooler than Conditioned Space 10 by a preset offset temperature and cooling demand is met within a preset time period, Stage 1 cooling is the only means activated. If Stage 1 cooling does not meet cooling demand within a preset time period or to meet programmed response requirements such as a change in temperature over time, Stage 2 cooling is activated.

Stage 2 cooling extracts heat from Conditioned Space 10 using the Thermally-Conductive Structure 16. Based on sensor input for temperature, relative humidity, and atmospheric pressure, Microprocessor Controller 12 calculates the dew point of Thermally-Conductive Structure 16 and Conditioned Space 10. Microprocessor Controller 12 adds an offset temperature to the higher of these dew points, which determines Mixed Radiant Supply Fluid 8. The sources for chilled fluid include Thermal Storage One 46, Ground Heat Exchanger One 64 and Ground Heat Exchanger Two 66, or Process Heat Exchanger 68. In one embodiment, Process Heat Exchanger 68 is eliminated and Ground Heat Exchanger One 64 and Ground Heat Exchanger Two 66 fluids are used directly to cool the Thermally-Conductive Structure 16. Heat Pump 72 can be activated to chill Thermal Storage One 46 if no source is at or below the required Mixed Radiant Supply Fluid 8 temperature. If either Ground Heat Exchanger One 64 or Ground Heat Exchanger Two 66, or Process Heat Exchanger 68 are at a lower temperature than the required Mixed Radiant Supply Fluid 8 temperature, HBSC activates Bypass 3-Way Control Valves 74 to bypass Heat Pump 72, activates Thermal Storage Source 3-Way Control Valves 78 to Thermal Storage One 46 position, and activates Load Circulator 70 and respective Source Side Circulator One 60, Source Side Circulator Two 62, or Process Heat Circulator 90 to chill Thermal Storage One 46. When Thermal Storage Temperature Sensor One 44 senses that Thermal Storage One 46 temperature is lower than the desired set point for the mixed radiant supply fluid, HBSC activates Thermal Load 3-Way Control Valves 84 to Thermal Storage One 46 setting and activates Hydronic Load Circulator 52. Radiant Mixing Device 14 is modulated to maintain the desired Mixed Radiant Supply Fluid 8 temperature. If the source fluid maintains the set point temperature, the Stage 2 cooling continues until the comfort temperature in Conditioned Space 10 is met. If during Stage 2 cooling, HBSC determines that a chilled Mixed Radiant Supply Fluid 8 temperature cannot meet cooling demand, or that the required Mixed Radiant Supply Fluid 8 temperature that meets cooling demand is below the dew point, Stage 3 cooling is activated.

Stage 3 cooling requires Thermal Storage One 46 tank temperature to be less than dew point in order to condense moisture on the fan coil and affect dehumidification of air passing through Hydronic Coil-to-Air Heat Exchanger 42. Using the same logic finding a source in Stage 2 cooling, HBSC activates Stage 3 cooling of Thermal Storage One 46 based on the source providing the highest cooling thermal output at the lowest energy input. If Process Heat Exchanger 68 or Ground Heat Exchanger One 64/Ground Heat Exchanger Two 66 fluids are at a higher temperature than the required Thermal Storage One 46 temperature, HBSC directs Bypass 3-Way Control Valves 74 to the Heat Pump 72 position, selects the source heat exchanger fluid at the lowest temperature, and activates the lowest Heat Pump 72 compressor setting to meet the chilled water demand. This setting can be pre-programmed as an open loop control, or calculated in real time using feedback from Thermal Storage Temperature Sensor One 44 response over a set time period. As the temperature drops in Thermal Storage One 46, Radiant Mixing Device 14 modulates the mixing of Hydronic Return Fluid 40 to maintain Mixed Radiant Supply Fluid 8 above the set point above dew point.

When Heat Pump 72 cools Thermal Storage One 46 below the temperature required for air coil condensation, HBSC activates Hydronic-to-Air Circulator 54 to circulate Hydronic Coil Supply Fluid 50. If the energy transfer and ventilation is not already operating, HBSC turns on Hydronic-to-Air Circulator 54 to the lowest fan setting which provides sufficient ventilation and maximum dehumidification across the fan coil. As Fresh Intake Air 28 passes through Hydronic Coil-to-Air Heat Exchanger 42, the resultant Conditioned Air 24 will be cooled and have less humidity than Fresh Air Supply 36. With continuous operation, this process will lower the relative humidity and calculated dew point in Conditioned Space 10. The lower dew point in Thermally-Conductive Structure 16 will enable a lower Mixed Radiant Supply Fluid 8 temperature making Thermally-Conductive Structure 16 more effective as a cooling heat exchanger.

Using historic data, climate data, or real time weather data, the staging and set points of these options can be adjusted to predict set points for optimal comfort, or stage processes for optimal system energy efficiency. HBSC incorporates thermal mass of Thermally-Conductive Structure 16 by creating LEAD/LAG times for temperature response based on structure.

In another embodiment, Heat Pump 72 can chill Thermal Storage One 46 while rejecting heat to Thermal Storage Two 80 or Process Heat Exchanger 68 without using Ground Heat Exchanger One 64 or Ground Heat Exchanger Two 66. In low grade temperature applications such as pool heating while cooling a chilling tower, the system energy efficiency is twice that of a heat pump heating or chilling while operating with the ground heat exchanger.

HEATING OPERATION—It is known that radiant floor heating processes are mature art and condensation on Thermally-Conductive Structure 16 is not a consideration. HBSC provides innovations beyond current art to increase user comfort, design flexibility, and energy efficiency improvements.

HBSC uses a reset curve to determine a set point to meet heat demand in Conditioned Space 10. This set point is based on outside air temperature, Conditioned Space 10 air temperature, Thermally-Conductive Structure 16 temperature, and desired comfort set point. In one embodiment, HBSC uses weather forecast data to modify set points for efficiency and comfort using known algorithms such as such as pre-cooling prior to forecast peak demand loads. Similar to cooling sequences, HBSC accepts temperature sensor inputs to determine highest system energy efficiency based on passive heat from Process Heat Exchanger 68 or Ground Heat Exchanger One 64 or Ground Heat Exchanger Two 66, or active heating using Heat Pump 72. If Heat Pump 72 is the source of high grade heat, HBSC could select one or more Ground Heat Exchanger One 64 or Ground Heat Exchanger Two 66 or Process Heat Exchanger 68 as a source fluid providing the highest Heat Pump 72 heating efficiency. Using known algorithms and Heat Pump 72 manufacturer performance data, efficiency increases when providing hotter source water in heating mode and cooler source water in cooling mode within specific operating ranges. This method may be overridden when system energy efficiency is higher at source temperatures different than that temperature for highest Heat Pump 72 efficiency when considering all system components.

In one embodiment, Process Heat Exchanger 68 is a high temperature solar thermal array. HBSC would select this source for passive heating by activating Source 3-Way Control Valves One 56 and Source 3-Way Control Valves Two 58 to position Process Heat Exchanger 68, activating Bypass 3-way Control Valves 74 to bypass Heat Pump 72, and activating Thermal Storage Source 3-way Control Valves 78 to the Thermal Storage Two 80 position. If the solar thermal production reduces Process Heat Exchanger 68 temperature below the required Mixed Radiant Supply Fluid 8 temperature, but at a temperature higher than the Ground Heat Exchanger One 64 or Ground Heat Exchanger Two 66, Heat Pump 72 would be activated in heating mode and operating against Process Heat Exchanger 68 as the source.

If this source continued to drop in temperature below that of Ground Heat Exchanger One 64/Ground Heat Exchanger Two 66, HBSC would affect the valve and pump positions to operate Heat Pump 72 in a conventional configuration with the ground heat exchangers.

Ground Heat Exchanger One 64/Ground Heat Exchanger Two 66 may be monolithic, or separate into one or more zones. The embodiment shown in FIG. 1 shows two separate ground heat exchanger zones. This number of zones can be increased by adding a dedicated source circulator (such as Source Side Circulator One 60/Source Side Circulator Two 62) and source mixing device (such as Source Mixing Device One 86/Source Mixing Device Two 88) to additional ground heat exchanger zones. These zones can serve as thermal energy storage for the overall system moving energy from the Thermal Storage One 46/Thermal Storage Two 80) or Process Heat Exchanger 68. The thermal storage can either be chilling or heating high thermal mass. In the case of Process Heat Exchanger 68 representing a solar hot water thermal array, Ground Heat Exchanger One 64/Ground Heat Exchanger Two 66 can store excess heat from the solar thermal system to address a future thermal need. Similarly, heat extracted from Conditioned Space 10 via Thermally-Conductive Structure 16 and rejected to Thermal Storage Two 80, can be extracted from Thermal Storage Two 80 and sent to Ground Heat Exchanger One 64 or Ground Heat Exchanger Two 66.

The application of HBSC is not limited to radiant floor applications. Anywhere that the embodiment refers to Thermally-Conductive Structure 16, another embodiment for the hydronic distribution is to a hydronic fan coil similar to the function of Hydronic Coil-to-Air Heat Exchanger 42. In commercial buildings, the embodiment of the hydronic distribution to the conditioned space is to a thermally conductive structure, which involves radiant low or high mass structures, hydronic fan coils, or variable air velocity hydronic fan coils.

Control Algorithm Optimization Beyond the Current Art—HBSC implements innovative algorithms that reduce building energy use at a substantially lower cost than the energy saved. One embodiment is hosted on a physical microprocessor based on low-cost commodity hardware developed for the smart phone industry.

Figure 2:
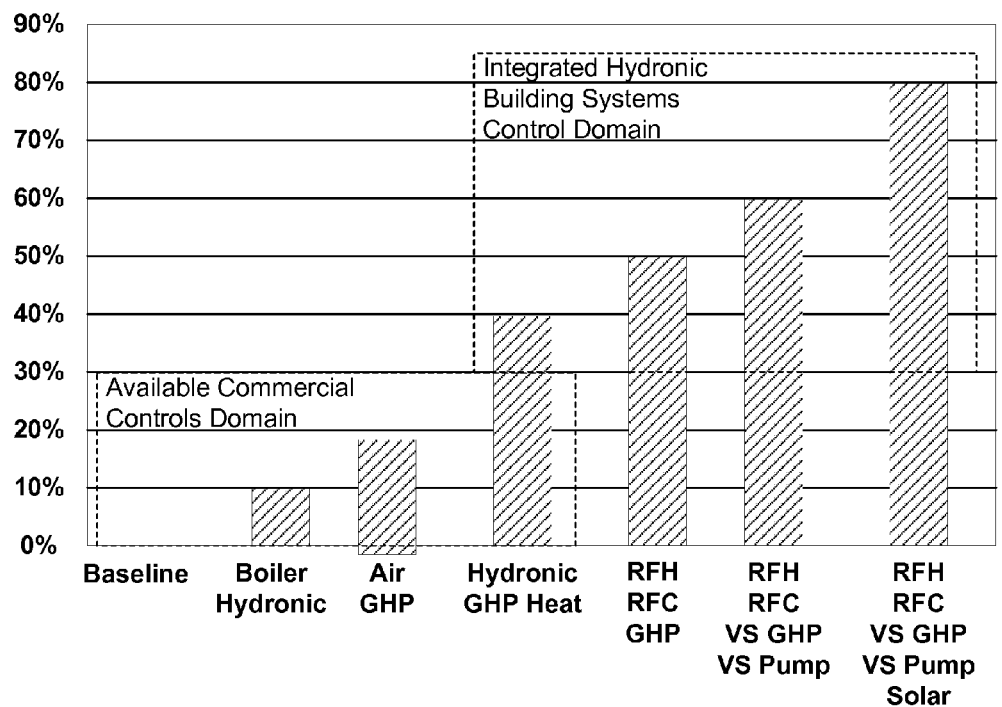
FIG. 2 shows a bar graph of HBSC energy savings potential compared to a baseline HVAC system.

HBSC energy savings potential increases substantially when advanced GHP equipment and high mass hydronic architecture are integrated in a holistic design. FIG. 2 illustrates controls potential to reduce energy based on equipment selection and distribution system, as compared to a baseline gas forced-air heating system with conventional outdoor direct exchanger vapor compression refrigeration.

The major technology gaps overcome by HBSC include:
1. Implementing operating parameters for RFC and humidity control for multiple climate zones, and algorithms which provide the highest system energy efficiency for tracking dew point and actively controlling humidity;
2. Meeting the functional requirements and metrics by implementing the sequence of controls and software for the proposed hydronic systems architecture; and
3. Deploying optimization algorithms for highest system energy efficiency during GHP partial and full load conditions, for Water-to-Water and Water-to-Air GHPs, equipped with single stage, two-stage, and variable speed compressors, and the linear control of fixed, multiple, and variable speed source circulators.

Figure 3:
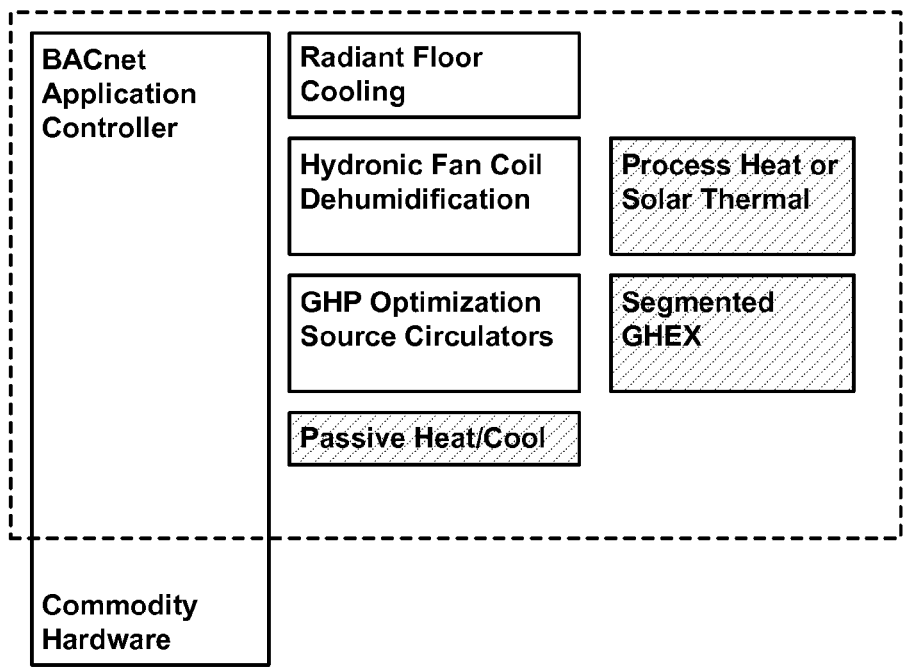
FIG. 3 shows the technology gaps addressed by HBSC.

These technology innovations are illustrated in FIG. 3. The functionality defined by the shaded areas represents algorithms for passive heating and cooling potential. HBSC algorithms use a conceptual model which implements a hydronic design providing interoperability between GHPs and alternative thermal heating and cooling sources. Traditional control architectures lack interoperability and innovation. Controls are typically designed to operate one device. In residential applications, a dedicated thermostat controls the furnace, a surface mounted aqua stat controls the hot water heater, a switch controls the bath fan, etc. These controls are wired using industry standard least-common-denominator bus connections for basic heat, cool, or fan which are not designed for the highest performance. One control unit does not know the existence of, or the capabilities of, another control unit or equipment within the home or building. While commercial applications may operate multiple devices, the controls logic and features are similar to residential systems. As equipment or new functions are added, the overall system resembles a jigsaw puzzle of increasing complexity where potential energy improvements are limited to the interoperability (or lack thereof) with existing infrastructure. In new construction involving commercial buildings with advanced features, dedicated controls contractors must write custom code to provide the links between disparate equipment, sensors, and controls. In general, these DDC programmers lack the knowledge to optimize component and system efficiencies.

Figure 4:
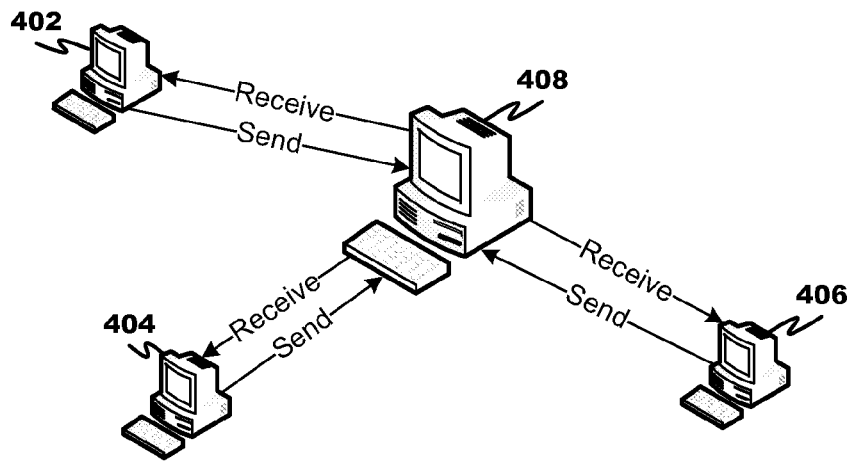
FIG. 4 shows a client-server computing architecture applicable to HBSC.

By applying client-server computing architectures, such as shown in FIG. 4, to building controls, HBSC overcomes these interoperability limitations. HBSC is based on a model representing the potential heating and cooling and ventilation processes available to meet user requirements. A common Client-Server Architecture 400 provides interoperability to legacy and new equipment. Rather than requiring new equipment to fit into the puzzle created by the existing infrastructure, the new equipment must comply with a common systems architecture standard. The complexity of the system is reduced to common application programming interfaces. Quite simply, any Client (a control) 402/404/406 should communicate to any Server (HVAC equipment) 408. As proven with information technology (IT) systems, Client-Server Architectures 400 are powerful.

One HBSC embodiment is a building controls architecture based on BACnet, a national and international standard proven in commercial applications and readily available. One market barrier to BACnet controls is the high cost of BACnet-compatible hardware processors. The lowest cost controls platform is one which has the largest worldwide market share. One embodiment to reduce the hardware cost of this processor is to host it on a RISC-based smart phone platform.

Figure 5:
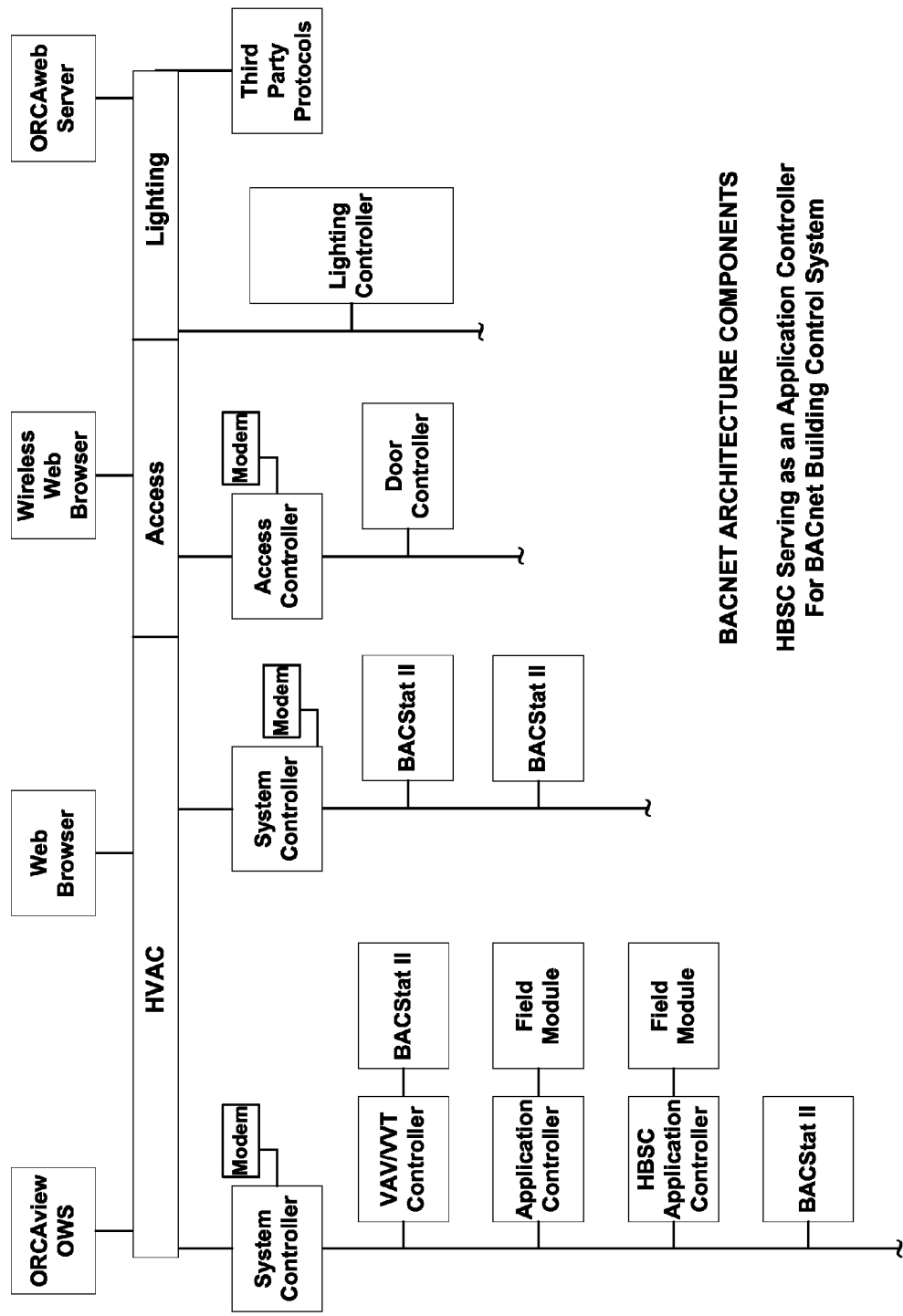
FIG. 5 shows a HBSC device serving as an application controller in an enterprise building automation system.

BACnet-compatible algorithms are ported to a commodity hardware microprocessor platform developed to serve the smart phone industry. As shown below in FIG. 5, a HBSC device will serve as an application controller within a larger network, or as a low cost control for standalone applications.

HBSC software implements process control for a functional model of a generic building heating, cooling, and hot water system. The model has functions found in traditional buildings and advanced features that implement controls technology unavailable today. The basic functionality uses best practices algorithms known in the art for the control of traditional equipment for the production of hot water, chilled water, and ventilation equipment. Integrated systems capabilities make HBSC innovative. While using known algorithms, the implementation is unique with advanced hydronic features unavailable in controls today. Capabilities include dew point tracking with humidity control, which enables radiant floor cooling implementations, and direct use of solar thermal fluids for heating, or ground heat exchanger fluids for passive cooling. For the control of legacy and new GHP equipment, HBSC controls the source circulators in a linear relationship to compressor demand to optimize system performance.

HBSC has the collective potential to increase the Seasonal Performance Factor for the Heating System ($SPF_{HS}$) up to 30% over traditional GHP designs using conventional controls. When installed with high mass radiant cooling, the system energy efficiency increases to 40% over conventional forced air GHP systems. These gains are derived from the effectiveness of the radiant floor infrastructure and the lower condenser temperatures within the GHP. RFC systems require twice the tubing density (six inches on-center spacing) of radiant floor heating systems. As compared to heating, RFC requires a higher volume of heat transfer fluid (usually water) which increases thermal mass and system lag time (time period for fluid to complete one circuit through the distribution system), while decreasing hydronic circulation flow rate which reduces circulator energy. Embedded in a structural concrete slab or lightweight concrete topping, a high mass radiant floor configured for cooling is a highly efficient heat transfer medium. The tubing density required for a RFC heat exchanger increases the heat transfer coefficient and reduces the mean temperature difference. With the same inlet temperature and an increased flow rate through the GHP, the required mean temperature differential can be maintained with a lower condensation temperature. For the GHP condenser in heating mode, this means a lower average temperature level and thus a lower condensing pressure and reduced compressor work. Designing the hydronic heating system for the supply temperature of 90 degrees F. at the Design Outdoor Air Temperature (DOAT), instead of the more common 125 degrees F., will increase the $SPF_{HS}$ by approximately 40% (using the estimate that COP increases by 2% for each 1 degree K of lowered condensation temperature).

Since the thermal mass of the radiant floor will affect the cyclic behavior of the heat pump and temperature level of the system, it has the effect of lowering condensation temperatures even further. Traditionally, W-A GHPs with Electronically Commutated Motor (ECM) fans have a higher ARI COP rating than W-W GHPs. The $SPF_{HS}$ for low mass intermittent systems operation is 3% higher than high mass systems. This is due to the lower supply temperatures during compressor operation. However, low mass systems increase compressor cycling and contribute to user thermal discomfort caused by rapid changes in air temperatures between cycles. High thermal mass increases the system lag time. An example of low thermal mass radiant structures is PEX tubing which is attached to a low mass structure such as floor sheathing or wall paneling. A high mass structure involves embedding the PEX tubing (or any other type of appropriate piping) in concrete, light weight concrete, gypsum, or related high density material which creates lag time when heating or cooling due to the mass of the material.

Figure 6:
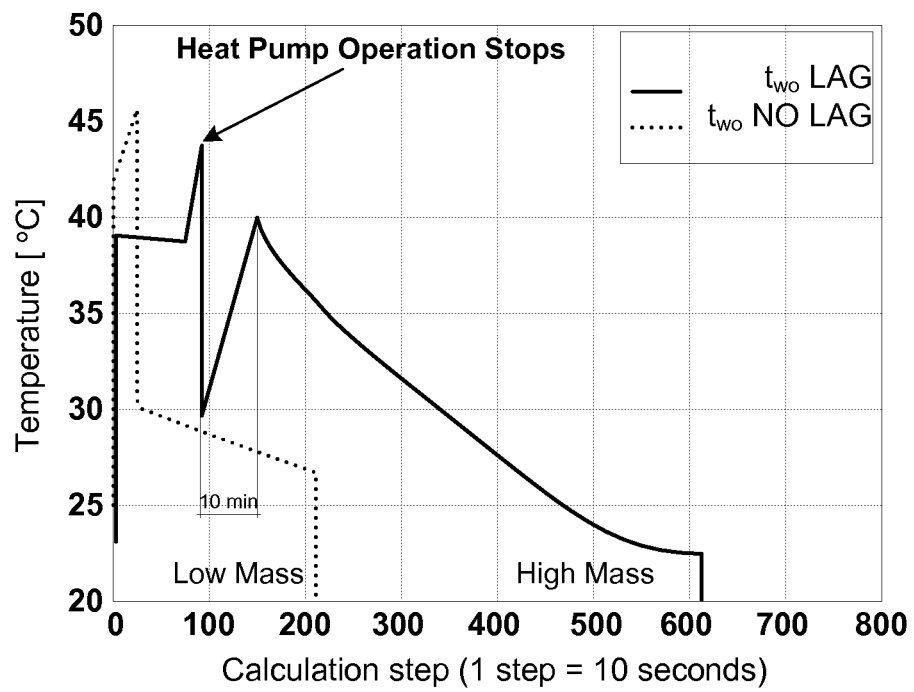
FIG. 6 shows a comparison of temperature levels for a radiator system with no lag time and ten minutes lag time.

A GHP equipped with a single stage compressor operating at full capacity and supplying a radiant hydronic system with a ten minute lag time increases $SPF_{HS}$ by 5% versus a radiator system with no lag time. This is shown in FIG. 6.

The $SPF_{HS}$ increases with increasing lag time because the average supply temperature is reduced during the compressor on-time. The plateau at the beginning of the cycle depicted by the solid line is due to lag time. The increase in $SPF_{HS}$ is optimal when a single stage W-W GHP is sized at a capacity which is 70-80% of the peak building demand at the DOAT.

While radiant heating algorithms are mature, the RFC optimization and control approach implemented in HBSC represents a significant advancement in the state of the art. HBSC is unique in the comprehensive and discrete control of an integrated system used in the process model and containing radiant floor cooling with dynamic dew point tracking and active humidity control, dual process heating and cooling sources, ventilation using a hydronic coil in line with energy recovery, and segmented ground heat exchangers to utilize alternative energy sources and optimize GHP and system performance. The innovative control enables deployment of this functionality as stand-alone capabilities, or as part of an integrated systems design as described in the first embodiment.

Hydronic Building Systems Control—Functionality And Benefits

1. Enable Radiant Floor Cooling With Humidity Control Functionality

Peak grid demand is driven by building cooling loads. Reducing peak cooling loads reduces grid energy use. RFC reduces cooling system energy by 17%-42% depending on climate zone, operates at higher distribution efficiencies than forced air, enables personal comfort space zoning, limits terrorist intrusion vulnerabilities of forced-air HVAC systems, and inherently eliminates the health risk from fatal infectious diseases caused by gram negative, aerobic bacteria (such as Legionella). RFC has the capacity to remove 12-14 $Btu/h/ft^2$ sensible gain and 25-32 $Btu/h/ft^2$ of radiant heat gain in spaces with direct solar exposure, such as large glass atriums. Using radiant roll-out mat installation methods, cross-linked polyethylene (PEX) tubing embedded in new construction concrete slabs is one-half the first cost of forced air ductwork. Existing buildings with installed high mass radiant floor heating can be upgraded to RFC at minimal cost. To avoid condensation in RFC applications, dew point sensing controls are required. RFC controls are available to control set cooling water temperature based on dew point, though these controls lack the functionality to actively control humidity. HBSC extends the art by providing this capability.

The primary function is to control cooling in a thermally-conductive structure, such as RFC or chilled beams. Radiant heating algorithms will use conventional methods. Zone sensors provide temperature, atmospheric pressure (or, the atmospheric pressure is accounted for by pre-programming in the algorithms, eliminating the need for atmospheric pressure sensors), and relative humidity data to determine a system dew point, and to set a supply water temperature which prevents condensation within the structure. When indoor humidity is low, wet bulb gain is negligible. With RFC, latent heat is removed by an air conditioning and ventilation system which incorporates air velocity sensing. In dry climates, a separate air conditioning system may not be required, as a chilled W-A coil used in conjunction with the VAV or ERV/HRV can provide limited latent heat extraction and dehumidification. In these applications, the control must provide chilled water below dew point to the W-A coil for dehumidification, while mixing RFC water to an offset temperature above dew point for use in the high mass thermally-conductive structure.

Radiant cooling systems are particularly effective at reducing direct solar heat gain on indoor floor surfaces. This is particularly relevant to passive solar homes where the design intentionally provides full shade in the summer and full sun in the winter. The high thermal mass of radiant heated floors exposed to direct solar heating tends to overheat the conditioned space. In winter months with mild outdoor air temperatures and a very efficient building envelope, high performance homes tend to overheat in mid-day with low sun angles. A radiant floor cooling system has the ability to directly extract infrared heat gains from the thermally conductive structure to prevent overheating in this scenario. Heat extracted for cooling is utilized in the integrated system to provide immediate heating or stored for future use.

Figure 7:
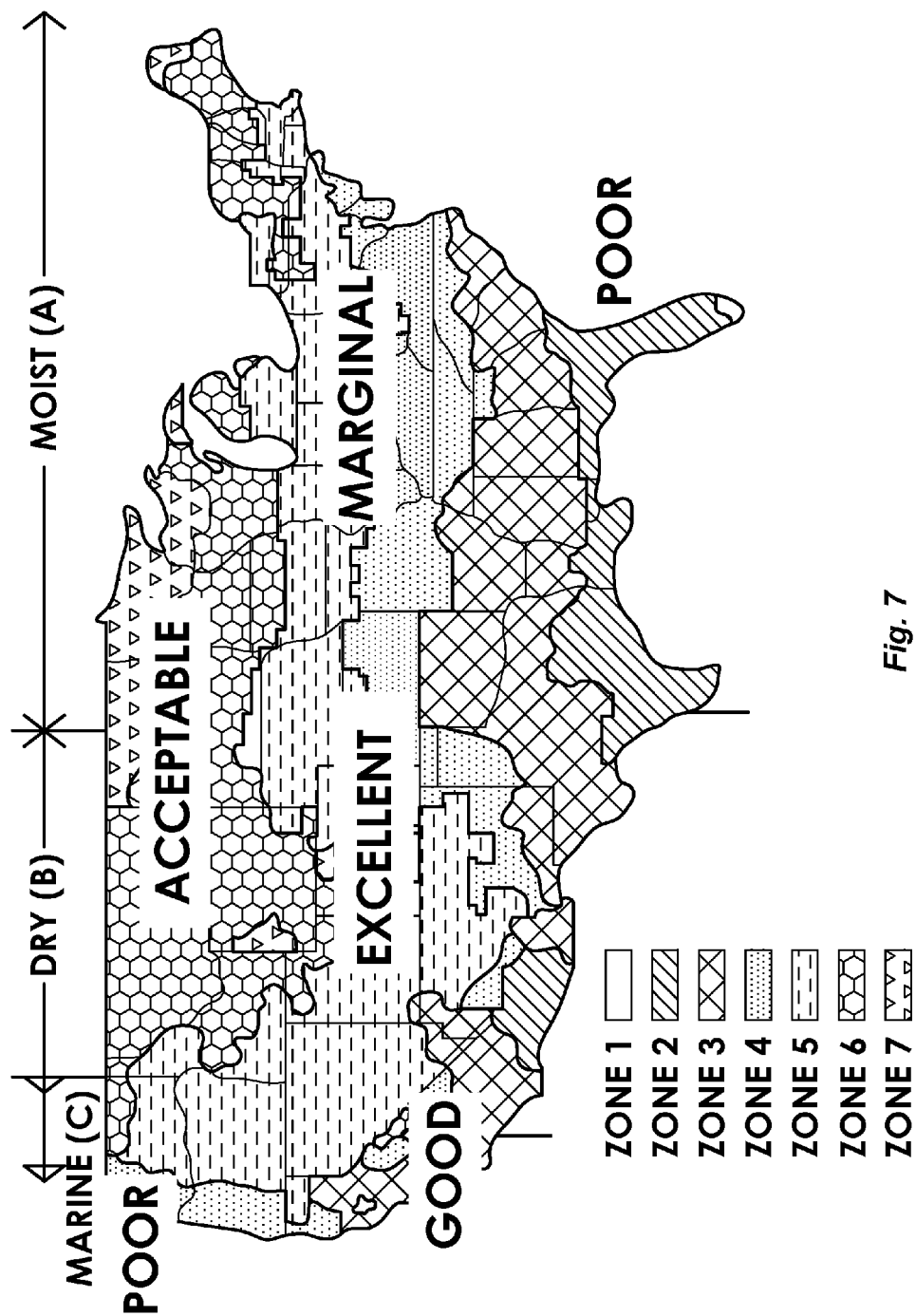
FIG. 7 shows the predicted radiant floor cooling efficiency for U.S. climate zones.

The efficiency of radiant cooling is limited by latent heat loads. FIG. 7 depicts an estimate of RFC potential within U.S. climate zones.

2. Implement Dual Process Heating Cooling Applications

Moving heat is usually more efficient than converting fuel or electricity to generate heat or cooling. Heat pumps inherently "move heat." The COP of a GHP doubles when the heat pump moves heat directly from a chilling source to a heating source without a ground heat exchanger. High mass hydronic systems operate at moderate temperatures, thus increasing equipment efficiency and providing an opportunity for direct use of passive heating or cooling with thermal storage. HBSC algorithms implement model-based passive strategies including night cooling, direct use of ground-coupled hydronic loops bypassing the chiller, segmenting the ground source heat exchanger to serve as a heat sink, ice storage, and night fluid or pre-cooling functionality. HBSC provides interoperability between traditional air cooling and dehumidification equipment, hydronic chillers/boilers, direct digital and analog to GHPs with innovative features, and accepts sensors for temperature, pressure, humidity, and air velocity and water flow. The controller selects an active or passive source based on set point heat and cooling source temperatures to meet building loads. It can operate as a standalone controller for residential applications, or serve as an industry standards-compliant sub-system controller for complex residential and commercial applications.

3. Segmented Ground Source Heat Exchanger

The GHEX is often oversized for cooling loads when designed for heating-dominated buildings or climates. With an integrated solar thermal system, this excess GHEX capacity can reduce costs and improve the GHP COP. The solar factor of thermal hot water systems is limited by storage capacity, which is often sized based on the thermal capacity of the array. Solar thermal collectors are one-half the costs of the required storage tanks sized to the array capacity. Therefore, the installed cost per Btu of capacity for a solar thermal array is substantially reduced if the solar array is expanded without increasing thermal tank storage capacity. A split or segmented GHEX makes this possible for heating dominated annual building loads. Consider the example for a GHP sized for ten GHEX loops or wells during winter heating operation. During summer operation, the GHEX meets the smaller cooling load using only six loops or wells, with the remaining four loops or wells available for thermal storage. The solar thermal array can be increased by the capacity provided by these four loops or wells. These loops or wells are "superheated" when compared to the stable ground temperature. When the GHP enters heating mode, COP increases as a result of the higher entering water temperature from the GHEX using all ten loops or wells. For a period of time during the transition from cooling to heating season, the hydronic radiant floor applications may directly use GHEX water in the heated loops or wells. HBSC will compare the radiant demand set point temperature to the GHEX loops or well temperature and solar thermal supply temperature to select a direct energy source, or the need to operate the GHP compressor to meet demand, which is higher (in heating) or lower (in cooling) to meet the space conditioning requirements.

With system-wide sensing and digital control of an advanced GHP, HBSC will operate the GHP to provide the highest system COP/EER. HBSC controller is operable to command the following actions:
 1. Direct use of the solar thermal fluid (bypassing the GHEX);
 2. Direct use of GHEX fluid;
 3. Engage the GHP to heat/cool the load side fluid to set point based on an outdoor reset; or
 4. Perform a combination of these functions.

The proposed integrated HBSC represents a significant advance over existing controls which are plagued by incomplete functionality, high cost, complex and proprietary installation requirements, and a failure to recognize advanced capabilities of GHPs. HBSC delivers an affordable and interoperable control based on existing commercial standards, and reduces installation cost, complexity, and serviceability of the control system.

Related Research or R&D—Thermodynamics is not a new science. A patent of particular relevance to radiant floor cooling was issued in 1993 to Galiyano (U.S. Pat. No. 5,261,251) which disclosed a hydronic cooling and heating system through a slab with an in-ground heat exchanger and compressor. U.S. Pat. No. 7,234,314 discloses methods for geothermal heating and cooling with solar heating. Dehumidification using an ERV is disclosed in U.S. Pat. No. 7,845,185. Dr. Roy Crawford has a patent pending for humidity control for air conditioning systems (U.S. Patent Publication No. 2007/0261422 A1). Control algorithms have been researched since the mid-$20^{th}$ century. Today, this basic science is used in residential, commercial, and industrial buildings worldwide. Work in Sweden by Karlsson and Fahlén are just a few of many that have shown ground source heat pumps can be optimized in hydronic heating and cooling applications. The literature is replete with current research in this area.

Likewise, software programmable microprocessors with open standards interoperability such as BACnet have been developed for decades. While different in application, the science of enterprise control of heating and cooling systems is not new or particularly complex. The unique combination of these elements into a single low cost control system is innovative and unique. There are undoubtedly hundreds of patents for controls involving radiant hydronic heating and cooling systems, variable speed devices, solar thermal storage, and latent heat extraction.

With more advanced control algorithms, system efficiencies utilizing W-W GHPs can be increased substantially. By focusing mainly on incremental enhancements to existing systems, controls manufacturers have avoided innovative HVAC products and designs which promise to deliver the highest return on investment when balancing first costs with energy savings. Examples include the control of two-stage and variable speed water-water GHPs and multi-speed and variable speed flow center pumps. There has been no demand for an optimized control for integrated hydronic systems with water-water GHPs, since no U.S. GHP manufacturer offers VS technology in W-W heat pumps. In Europe, VS W-W heat pumps are equipped with internal controls for heating only applications. Controls manufacturers have not addressed the need for enterprise control as geothermal heat pumps represent less than ½% of the HVAC control market of which W-W units in hydronic applications constitute a miniscule market segment.

European hydronic system configurations and modeling methods are the most compelling, and specifically research funded by the Swedish Energy Agency (SEA) involving W-W GHPs equipped with VS compressors, electronic expansion valves, and variable frequency drive circulators in hydronic heating applications.

The European Heat Pump Association has reported that more than 127,000 heat pumps were installed in Sweden in 2011 making Sweden the largest market in Europe. While hydronic heating with radiators is the prevalent distribution system, new homes utilize in-floor heating. According to the SEA, the heat pumps installed will supply 22.5 Terawatt Hours (TWh) of capacity. Of this, 15 TWh is free energy from the ground representing 10% of all energy supplied to Swedish buildings. Research which is relevant to this innovation was funded by the SEA and carried out at SP Technical Research Institute of Sweden and Chalmers University of Technology, in collaboration with Wilo, Grundfos, Carrier, Uponor, and others. The scope of work was "to investigate the potential for increased system energy efficiency of heat pumps by applying variable-speed capacity control to compressors, pumps and fans, as well as an overall strategy for on-line optimization of the operation," with the core focus on GHPs connected to hydronic heating. The SEA study results are consistent with proposed HBSC functions implementing GHP-centric hydronic systems in the United States, including:

1. System design and control can positively impact system energy efficiency more than individual component improvements (GHP, pumps, compressors, and fans). When evaluating VS and intermittent GHP operation, it is important to consider the transient behavior of the heating system (not just steady state conditions);
2. The use of efficient circulators is of primary importance for GHPs equipped with VS compressors;
3. Source circulator capacity control can be implemented using simple algorithms approaching optimal control. These algorithms can be external to the circulator, as many internal (on-line) state-of-the-art controls need improvement for optimal efficiency;
4. The $SPF_{HS}$ is the appropriate metric for the energy efficient design of an integrated GHP hydronic heating system;
5. With optimal control, $SPF_{HS}$ can be improved 30% over conventional methods; and
6. Heat pump EER and COP are poor predictors of overall system heating and cooling system performance.

Figure 8:
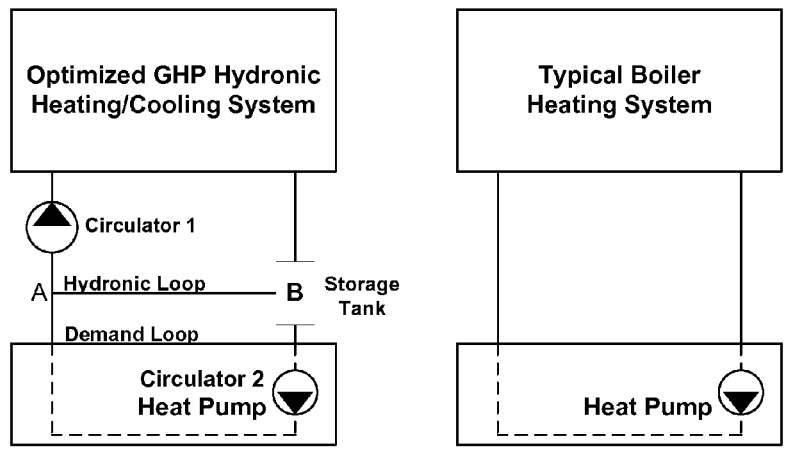
FIG. 8 shows a GHP parallel piping design versus a serial boiler connection to a hydronic system.

Ground source heat pump source side flow requirements are the key external determinant affecting GHP efficiency. Serial hydronic systems designs for conventional boiler systems are not appropriate for GHP applications, since source side flow rate is not optimized for distribution loop flow. This concept is shown in FIG. 8. The connection of the GHP to the hydronic system assumes a primary/secondary piping configuration as shown on the left in FIG. 8. The design incorporates a parallel connection which differs from a typical boiler heating system piped in series to the distribution circuit shown on the right in FIG. 8.

This method decouples the heat pump demand circuit from the hydronic distribution, so that loop flows are optimal for the respective application. The most energy efficient flow rate for the hydronic loop occurs at the lowest flow rate that will meet building demand. Lower flow rates during heating are possible when the system is designed for the increased PEX tubing density required for RFC operation. The slightly higher materials cost are offset by the benefits incurred: lower operating costs, reduced noise and erosion, and lower head pressure. The hydronic loop (Circulator 1 in FIG. 8) flow rate should be higher than the demand loop (Circulator 2) to insure mixing occurs on the supply side A, instead of the return side B. This configuration ensures GHP efficiency based on optimum entering water temperature.

The ideal flow in the demand loop is dependent on the GHP configuration and capacity, related to the building load. Contrary to conventional wisdom, the optimal design may not optimize the COP; rather, it should be based on the $SPF_{HS}$. COP is the performance ratio of heat supplied to the demand loop compared to the work consumed in a steady state by an electric compression heat pump at a given set of temperature conditions. SPF is the ratio of the heat energy delivered (Btu's) and the total energy supplied (watt/hr) over a season. While the system heating metric $SPF_{HS}$ is illustrative, cooling system performance would utilize a similar metric such as $SPF_{CS}$. SPF differs from COP in that boundary parameters can be established for the Heat Pump ($SPF_{HP}$), Heat Pump System including pumps or fans ($SPF_{HPS}$), or the Heating System ($SPF_{HS}$), GHP, pumps, fans, and supplement heating. SPF accounts for intermittent or partial load GHP operation, varying operating temperatures, and energy expended for ancillary equipment operation. COP can be misleading on predicting actual energy savings. For instance, a VS GHP delivers better performance at partial load conditions with an 11% increase in COP. A GHP equipped with a single stage compressor has a 14-19% higher $SPF_{HS}$ after considering the energy losses of the Variable Frequency Drive (VFD) and circulation pumps operating at full speed under partial load conditions. HBSC establishes a demand loop flow rate to optimize $SPF_{HS}$, yet as a secondary function to the source side circulator.

Figure 9:
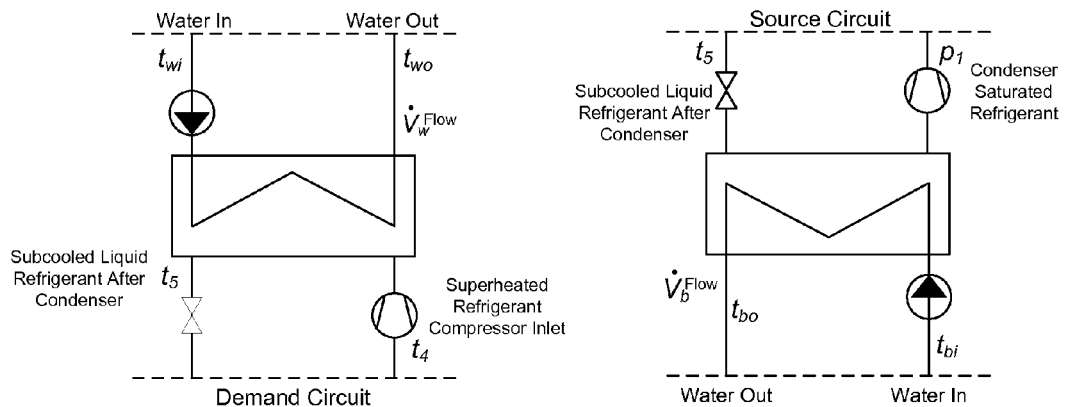
FIG. 9 shows the boundaries for optimizing the demand and source systems for a typical GHP.

The dominant control parameter to establish optimal $SPF_{HS}$ or $SPF_{CS}$ for fixed and VS GHPs is source circulator flow rate. This control parameter outweighs the effect of any other parameter depicted in FIG. 9 outlining the system boundary conditions for a typical GHP. The demand circuit input data are load return water temperature ($t_{wi}$), the evaporator temperature, evaporator superheat, required demand capacity, and the temperature differential between $t_5$ and $t_{wi}$ across the heat exchanger. The source circuit input data include the source entering water temperature (EWT, or $t_{bi}$-brine in), the temperature of the refrigerant leaving the condenser, the condensing pressure, and the evaporator superheat. Controlling the source side flow set point (ground loop flow center) is the key determinant to GHP efficiency. Varying demand side circulator flow from 60% to 100% capacity affects actual COP by only 1% as compared to the optimal COP. In contrast, setting the source circulator speed as a linear function of the compressor speed can improve the $SPF_{HS}$ as much as 20% for single or two-stage W-W GHPs, or VS GHPs without on-board flow center circulator control.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and circuitry and widely differing embodiments and applications will suggest themselves without departing from the scope of the disclosed subject matter.

What is claimed is:

1. A method for controlling heating and cooling in a conditioned space, the method comprising the steps of:
    (a) receiving in a microprocessor controller a desired set point temperature and a desired set point humidity;
    (b) receiving in the microprocessor controller a plurality of sensor inputs from a plurality of sensors, wherein the plurality of sensors sense at least one temperature and at least one relative humidity;
    (c) processing by the microprocessor controller the plurality of sensor inputs from the plurality of sensors in light of the desired set point temperature and the desired set point relative humidity;
    (d) calculating and tracking by the microprocessor controller a first dew point in a fresh intake air moving into a dehumidifying device; and a second dew point in a thermally conductive structure in the conditioned space;
    (e) sending a plurality of digital signals from the microprocessor controller to a devices controller; and
    (f) sending a plurality of control signals from the devices controller to a plurality of devices, the plurality of devices selected from the group consisting of analog devices and digital devices, wherein the plurality of devices upon receiving the plurality of control signals achieve the desired set point temperature and the desired set point humidity in the conditioned space by:
        (i) circulating a fluid within at least one of the thermally conductive structure and the dehumidifying device, wherein the dehumidifying in fluid connection with the thermally conductive structure;
        (ii) moving the fresh intake air through the dehumidifying device and into the conditioned space;
        (iii) keeping a first temperature of the fluid less than the first dew point at the dehumidifying device; and
        (iv) keeping a second temperature of the fluid greater than the second dew point at the thermally conductive structure.

2. The method according to claim 1 wherein step (f)(ii) further comprises the steps of:
    moving the fresh intake air through an energy transfer and ventilation device prior to the dehumidifying device, wherein the energy transfer and ventilation device is at least one of an energy recovery ventilator, a heat recovery ventilator, a dehumidifier, an absorption chiller, and an air conditioner;
    drawing the fresh intake air into the energy transfer and ventilation device with a fresh air fan; and
    exhausting stale exhaust air from the energy transfer and ventilation device with an exhaust air fan.

3. The method according to claim 1 wherein step (a) further comprises the steps of:
    receiving through a user interface in communication with the microprocessor controller the desired set point temperature and the desired set point humidity, wherein the microprocessor controller further provides the functionality for:
    storing a plurality of settings of system operating parameters; and
    displaying system operations on a display device of the user interface.

4. The method according to claim 3 further comprising the steps of:
    enabling communications between the user interface and the microprocessor controller through a communications module; and
    receiving in the communications module weather and climate data from at least one external device.

5. The method according to claim 1 further comprising the steps of:
    storing a first portion of the fluid in a first thermal storage;
    storing a second portion of the fluid in a second thermal storage;
    circulating the first portion of the fluid from the first thermal storage to the dehumidifying device and returning the fluid back to the first thermal storage; and
    circulating at least one of the first portion of the fluid and the second portion of the fluid from at least one of the first thermal storage and the second thermal storage to the thermally conductive structure based upon the positions of a first and second thermal load 3-way control valves each fluidly connected to the first thermal storage and the second thermal storage.

6. The method according to claim 5 further comprising the step of:
    in an active chilling operation, cooling the first portion of the fluid in the first thermal storage with a heat pump having one or more speeds, a load circulator, and a first positions of a first and second thermal storage source 3-way control valves each fluidly connected to the first thermal storage and the second thermal storage; and
    in an active heating operation, heating the second portion of the fluid in the second thermal storage with the heat pump having the one or more speeds, the load circulator, and a second positions of the first and second thermal storage source 3-way control valves;
    wherein the one or more speeds of the heat pump is set to achieve a highest system energy efficiency.

7. The method according to claim 5 further comprising the steps of:
    in a passive chilling operation that bypasses the heat pump, cooling the first portion of the fluid in the first thermal storage by circulating the first portion of the fluid with a bypass 3-way load circulator through a heat exchanger, and a first positions of a first and second bypass 3-way control valves each fluidly connected to the first thermal storage and the second thermal storage, and a first positions of a first and second first source 3-way control valves each fluidly connected to the heat exchanger; and in a passive heating operation that bypasses the heat pump, heating the second portion of the fluid in the second thermal storage by circulating the second portion of the fluid with a bypass 3-way load circulator through the heat exchanger, and a second positions of the first and second bypass 3-way control valves and a second positions of the first and second first source 3-way control valves.

8. The method according to claim 5 further comprising the steps of:
in a passive chilling operation that bypasses the heat pump, cooling the first portion of the fluid in the first thermal storage by circulating the first portion of the fluid with a bypass 3-way load circulator through a process heat exchanger, and a first positions of a first and second bypass 3-way control valves each fluidly connected to the first thermal storage and the second thermal storage, and a first positions of a first and second second source 3-way control valves each fluidly connected to the process heat exchanger; and
in a passive heating operation that bypasses the heat pump, heating the second portion of the fluid in the second thermal storage by circulating the second portion of the fluid with a bypass 3-way load circulator through the process heat exchanger, and a second positions of the first and second bypass 3-way control valves and a second positions of the first and second second source 3-way control valves.

9. The method according to claim 8 wherein the process heat exchanger is selected from the group consisting of a boiler, a chiller, a solar thermal array, a combined heat and power unit, and an absorption chiller.

10. The method according to claim 1 wherein steps (d), (e), and (f) further comprise the steps of:
(d1) continuously calculating and tracking by the microprocessor controller the first dew point and the second dew point;
(e1) sending an updated plurality of digital signals from the microprocessor controller to the devices controller; and
(f1) sending an updated plurality of control signals from the devices controller to the plurality of devices in order to maintain the desired set point temperature and the desired set point humidity in the conditioned space.

11. The method according to claim 1 wherein step (d) further comprises the step of:
accounting for atmospheric pressure when calculating and tracking by the microprocessor controller the first dew point and the second dew point.

12. The method according to claim 1 wherein step (f) further comprises the step of:
achieving the desired set point humidity in the conditioned space by circulating the fluid within the dehumidifying device and moving the fresh intake air through the dehumidifying device without circulating the fluid within the thermally conductive structure.

13. The method according to claim 1 wherein the dehumidifying device is selected from the group consisting of a hydronic coil-to-air heat exchanger, a dehumidifier, an air conditioning unit, an absorption chiller, and a heat recovery ventilator.

14. A method for controlling heat pump efficiency, the method comprising the steps of:
(a) calculating with a microprocessor controller a speed of a two-stage compressor of the heat pump to meet a demand, wherein the two-stage compressor has a first low-speed stage and a second high-speed stage;

(b) when the microprocessor controller determines that the two-stage compressor needs to run at the first low-speed stage to meet the demand, sending by the microprocessor controller a control signal to a two-stage source side circulator causing the two-stage source side circulator to circulate a fluid to the heat pump at a low-flow rate, wherein the two-stage source side circulator is fluidly connected to the heat pump and fluidly connected to a heat exchanger; and
(c) when the microprocessor controller determines that the two-stage compressor needs to run at the second high-speed stage to meet the demand, sending by the microprocessor controller a control signal to the two-stage source side circulator causing the two-stage source side circulator to circulate the fluid to the heat pump at a high-flow rate.

15. The method according to claim 14 further comprising the step of:
substituting a first source side circulator and a second source side circulator for the two-stage source side circulator, and the heat exchanger is a water-to-water heat exchanger;
when the microprocessor controller determines that the two-stage compressor needs to run at the first low-speed stage to meet the demand, sending by the microprocessor controller a control signal to the first source side circulator causing the first source side circulator to circulate the fluid to the heat pump; and
when the microprocessor controller determines that the two-stage compressor needs to run at the second high-speed stage to meet the demand, sending by the microprocessor controller a control signal to the first source side circulator and the second source side circulator causing the first and second source side circulators to circulate the fluid to the heat pump.

16. The method according to claim 14 further comprising the step of:
substituting a three-stage compressor for the two-stage compressor;
substituting a three-stage source side circulator for the two-stage source side circulator;
calculating with a microprocessor controller a speed of the three-stage compressor of the heat pump to meet the demand, wherein the three-stage compressor has a first low-speed stage, a second high-speed stage, and a third intermediate-speed stage;
when the microprocessor controller determines that the three-stage compressor needs to run at the first low-speed stage to meet the demand, sending by the microprocessor controller a control signal to the three-stage source side circulator causing the three-stage source side circulator to circulate the fluid to the heat pump at a low-flow rate;
when the microprocessor controller determines that the three-stage compressor needs to run at the second high-speed stage to meet the demand, sending by the microprocessor controller a control signal to the three-stage source side circulator causing the three-stage source side circulator to circulate the fluid to the heat pump at a high-flow rate; and
when the microprocessor controller determines that the three-stage compressor needs to run at the third intermediate-speed stage to meet the demand, sending by the microprocessor controller a control signal to the three-stage source side circulator causing the three-stage source side circulator to circulate the fluid to the heat pump at an intermediate-flow rate.

* * * * *